(12) United States Patent
Hyakudai et al.

(10) Patent No.: US 12,393,546 B2
(45) Date of Patent: *Aug. 19, 2025

(54) COMMUNICATION WITH SERIAL PERIPHAL INTERFACE INFORMATION

(71) Applicant: Sony Semiconductor Solutions Corporation, Kanagawa (JP)

(72) Inventors: Toshihisa Hyakudai, San Diego, CA (US); Junya Yamada, Kanagawa (JP); Satoshi Ota, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 38 days.

This patent is subject to a terminal disclaimer.

(21) Appl. No.: 18/547,646

(22) PCT Filed: Apr. 6, 2022

(86) PCT No.: PCT/JP2022/017149
§ 371 (c)(1),
(2) Date: Aug. 23, 2023

(87) PCT Pub. No.: WO2022/215701
PCT Pub. Date: Oct. 13, 2022

(65) Prior Publication Data
US 2024/0303215 A1  Sep. 12, 2024

Related U.S. Application Data

(60) Provisional application No. 63/171,745, filed on Apr. 7, 2021.

(51) Int. Cl.
*G06F 13/42* (2006.01)
*G06F 1/12* (2006.01)
*G06F 13/362* (2006.01)

(52) U.S. Cl.
CPC ............ *G06F 13/4282* (2013.01); *G06F 1/12* (2013.01); *G06F 13/362* (2013.01); *G06F 13/4291* (2013.01)

(58) Field of Classification Search
CPC ...... G06F 13/4282; G06F 1/12; G06F 13/362; G06F 13/4291; G06F 13/4027
See application file for complete search history.

(56) References Cited

U.S. PATENT DOCUMENTS 7,917,173 B2 * 3/2011 Lu ..................... H04N 1/32603
                                                            455/557
11,601,533 B1 * 3/2023 Hegar .................... H04L 69/16
(Continued)

FOREIGN PATENT DOCUMENTS

JP    2011039931 A    2/2011
JP    2011239011 A    11/2011
(Continued)

OTHER PUBLICATIONS

International Search Report (PCT/ISA/210), International Application No. PCT/JP2022/017149, dated Jul. 12, 2022.
(Continued)

*Primary Examiner* — Faisal M Zaman
(74) *Attorney, Agent, or Firm* — Michael Best & Friedrich LLP

(57) ABSTRACT

Communication devices, systems and methods are disclosed. In one example, a communication device includes: a communication unit that adds identification information for identifying a data block to a set of data blocks having a serial signal group conforming to SPI transmitted from a master in synchronization with a clock, and transmits the data block to a communication partner device within one frame period of a predetermined communication protocol, or adds identification information for identifying each of the data blocks, and transmits the data block to the communication partner
(Continued)

2: COMMUNICATION SYSTEM device in a plurality of frame periods; and a storage unit that sequentially stores a number of data blocks transmitted from the master, and then outputs a data block transmitted from the communication partner device in response to the number of data blocks, to transmit the data block to the master.

15 Claims, 18 Drawing Sheets

(56) References Cited

U.S. PATENT DOCUMENTS

| | | | |
|---|---|---|---|
| 11,960,434 B2* | 4/2024 | Hyakudai | G06F 13/362 |
| 11,971,842 B2* | 4/2024 | Hyakudai | G06F 13/1668 |
| 12,019,580 B2* | 6/2024 | Hyakudai | G06F 13/4282 |
| 2011/0122978 A1 | 5/2011 | Peichel | |
| 2011/0231509 A1 | 9/2011 | Schriefer | |
| 2015/0100716 A1* | 4/2015 | Rencs | G06F 13/385 710/308 |
| 2016/0049874 A1 | 2/2016 | Burke et al. | |
| 2016/0306770 A1 | 10/2016 | Mishra | |
| 2017/0075852 A1 | 3/2017 | Mishra | |
| 2017/0185548 A1* | 6/2017 | Sakuma | G06F 13/4282 |
| 2017/0228327 A1* | 8/2017 | Mishra | G06F 13/4282 |
| 2017/0300444 A1* | 10/2017 | Maletsky | H04L 12/40013 |
| 2019/0079575 A1* | 3/2019 | Hanson | G06F 1/3243 |
| 2019/0130845 A1 | 5/2019 | Han et al. | |
| 2019/0386966 A1* | 12/2019 | Ostrikov | G06F 13/4269 |
| 2020/0356519 A1* | 11/2020 | Ballantyne | G06F 13/4282 |
| 2020/0371977 A1* | 11/2020 | Sangolli | G06F 13/28 |
| 2021/0303503 A1* | 9/2021 | Remple | G06F 9/30101 |
| 2022/0123864 A1 | 4/2022 | Davies et al. | |
| 2022/0327091 A1* | 10/2022 | Wise | G06F 1/3206 |
| 2022/0385637 A1* | 12/2022 | Thangapandi | H04L 63/164 |
| 2022/0398211 A1 | 12/2022 | Wessling | |

FOREIGN PATENT DOCUMENTS

| | | |
|---|---|---|
| JP | 2018518083 A | 7/2018 |
| JP | 2018533120 A | 11/2018 |
| KR | 20150039142 A | 4/2015 |

OTHER PUBLICATIONS

Hobden, Peter et al., "Low Cost FPGA Implementation of a SPI over High Speed Optical SerDes", 2018 IEEE International Symposium on Smart Electronic Systems (iSES) (Formerly iNiS), 2018, pp. 146-151 Section II.
US Notice of Allowance dated Dec. 26, 2023 for related U.S. Appl. No. 17/713,534.

* cited by examiner

2: COMMUNICATION SYSTEM

2: COMMUNICATION SYSTEM

FIG. 10

| No. | NAME | FUNCTION Master→Slave | FUNCTION Slave→Master | DESCRIPTION | |
|---|---|---|---|---|---|
| C-1 | TRANSMISSION MODE | COMMAND | STATUS MONITOR | 0 | TRANSMIT ALL SPI FRAMES IN ONE TDD BURST |
| | | | | 1 | TRANSMIT ONE DB OF SPI FRAMES IN ONE TDD BURST |
| | | | | OTHERS | RESERVED |
| C-2 | CSn | COMMAND | STATUS MONITOR | | SELECT Slave BY Master. NOT ONLY Slave BUT ALSO A PLURALITY OF Slaves CAN BE SPECIFIED FOR CSn. S_SerDes CAN ALSO BE SPECIFIED |
| C-3 | SCK FREQUENCY | COMMAND | STATUS MONITOR | | SCK FREQUENCY ON Slave SIDE |
| C-4 | SPI MODE | COMMAND | STATUS MONITOR | 0 | CPOL=0, CPHA=0 |
| | | | | 1 | CPOL=0, CPHA=1 |
| | | | | 2 | CPOL=1, CPHA=1 |
| | | | | 3 | CPOL=1, CPHA=0 |
| C-5 | TOTAL NUMBER OF DBS | INFORMATION | STATUS MONITOR | | Master→Slave: TOTAL NUMBER OF 1SPI FRAMES, TOTAL NUMBER = 1 IF TRANSMISSION MODE = 1 Slave→Master: NUMBER OF DBS RECEIVED AFTER START OF SPI |
| C-6 | CURRENT DB POSITION | INFORMATION | N.A. | 0 | SELECTED IF TRANSMISSION MODE = 0 |
| | | | | 1 | HEAD DB ON SPI FRAME |
| | | | | 2 | DB OTHER THAN HEAD DB AND FINAL DB |
| | | | | 3 | FINAL DB ON SPI FRAME |
| C-7 | CURRENT DB STATUS | INFORMATION | INFORMATION | | 0: dummy, 1: VALID |
| C-8 | DB SIZE | INFORMATION | STATUS MONITOR | | TRANSMISSION DATA SIZE (IN BYTES), A MAXIMUM OF 511 BYTES |
| C-9 | Slave INTERRUPT | N.A. | INTERRUPT FLAG | 0 | WITHOUT INTERRUPT, 1: WITH INTERRUPT |
| C-10 | OPERATION STATUS ON SLAVE SIDE | N.A. | STATUS MONITOR | 0 | NORMAL STATUS |
| | | | | 1 | BUSY (DCP BUFFER IS EMPTY) |
| | | | | 2 | ERROR (SPI DATA PACKET IS CORRUPTED) |
| | | | | OTHERS | RESERVED |
| C-11 | SPI BLOCK RESET | COMMAND | N.A. | | 0: —, 1: RESET THE COMMAND OF SPI BLOCK OF S_SerDes |
| C-12 | CURRENT DB NUMBER | INFORMATION | INFORMATION | | Master→Slave: M_SerDes ASSIGNS AN ID TO EACH PACKET Slave→Master: S_SerDes ASSIGNS, TO EACH PACKET, THE SAME ID AS THE PACKET ID FROM M_SerDes |
| D-1 | DATA | MOSI DATA | MISO DATA | | SPI DATA |
| E-1 | CRC | CRC | CRC | | CRC PARITY |

COMMUNICATION WITH SERIAL PERIPHAL INTERFACE INFORMATION

TECHNICAL FIELD

The present disclosure relates to a communication device, a communication system, and a communication method.

BACKGROUND ART

A technique for performing high-speed serial communication between SerDes for Master and SerDes for Slave has been proposed (see Patent Document 1).

In a case where serial communication is performed between two SerDes, for example, a frequency division duplexing (FDD) method or a time division duplex (TDD) method is used. In a case where there is a large difference between the amount of data transmitted from one SerDes to another SerDes and the amount of data transmitted from the another SerDes to the one SerDes, it is conceivable to employ the TDD method to make a difference in data transmission capacity between the upstream direction and the downstream direction. The TDD method is a half-duplex communication method in which communication in the upstream direction and in the downstream direction cannot be performed at the same time, and communication in only one direction can be performed.

CITATION LIST

Patent Document

Patent Document 1: Japanese Patent Application Laid-Open 2011-239011

SUMMARY OF THE INVENTION

Problems to be Solved by the Invention

One of the serial communication standards is called serial peripheral interface (SPI). SPI is a full-duplex communication method capable of simultaneously performing uplink and downlink communications. Generally in SPI communication, an SPI master device (hereinafter, referred to as a master) and an SPI slave device (hereinafter, referred to as a slave) are directly connected to perform data communication. On the other hand, SPI communication may be performed between the master and the slave via a serial communication device for long-distance transmission called SerDes. In such a system, SPI communication may be performed between the master and the Master SerDes, SPI communication may be performed between the slave and the Slave SerDes, and serial communication may be performed between the Master SerDes and the Slave SerDes by the TDD method or the FDD method.

In this case, since the master cannot learn whether or not the serial communication between the Master SerDes and the Slave SerDes is completed, for example, a method is conceivable in which an interrupt signal is transmitted from the Master SerDes to the master to notify the master that the serial communication with the Slave SerDes is completed.

However, when an interrupt signal is transmitted and received between the master and the Master SerDes, it is necessary to provide pins for the interrupt signal in the master and the Master SerDes. Furthermore, it is necessary to provide an interrupt signal generation circuit inside the Master SerDes. In this manner, the interrupt signal may cause a complex hardware configuration.

Therefore, the present disclosure provides a communication device, a communication system, and a communication method capable of performing serial communication by combining different communication methods with a simple hardware configuration.

Solutions to Problems

In order to solve the problem described above, the present disclosure provides a communication device including: a communication unit that adds identification information for identifying a data block to a set of data blocks having a serial signal group conforming to a serial peripheral interface (SPI) transmitted from a master in synchronization with a clock, and transmits the data block to a communication partner device within one frame period of a predetermined communication protocol, or adds identification information for identifying each of a plurality of data blocks to the plurality of data blocks having each part of the serial signal group, and transmits the data block to the communication partner device in a plurality of frame periods; and
  a storage unit that sequentially stores one or more predetermined number of data blocks transmitted from the master, and then outputs a data block transmitted from a slave via the communication partner device in response to the predetermined number of data blocks from the master and stored therein, to transmit the data block to the master.

The predetermined number of data blocks may be transmitted to the communication partner device in the predetermined number of frame periods.

The predetermined number of data blocks may be a predetermined number of consecutive data blocks corresponding to total number information of the data blocks included in the serial signal group transmitted from the master.

A first counter that measures a length of the frame period on the basis of a reference clock shared between the master and the slave and
  a second counter that counts the number of data blocks transmitted from the master may be provided, and
  the storage unit may sequentially store the predetermined number of data blocks at timing corresponding to count values of the first counter and the second counter, and then output the stored data block from the communication partner device.

The reference clock may be a clock of a frequency defined by an Automotive SerDes Alliance (ASA) standard, and
  the second counter may perform a counting operation in synchronization with a clock included in a serial signal group conforming to the SPI.

A first period that is a period in which the predetermined number of data blocks transmitted from the master are stored in the storage unit may be equal to or longer than a second period that is a period in which the communication unit transmits a packet including the data block to the communication partner device.

The second period may be longer than a half period of the first period.

The communication unit may transmit the data block stored in the storage unit to the communication partner device in the frame period after the second period elapses after the data block transmitted from the master is stored in the storage unit.

The communication unit may transmit the data block stored in the storage unit to the communication partner device in the frame period before the second period elapses after the data block transmitted from the master is stored in the storage unit.

In a case where the data block to be transmitted to the communication partner device is not ready, the communication unit may stop transmitting the data block to the communication partner device until a next frame period.

In a case where the data block from the communication partner device does not arrive at the data block from the master, the storage unit may stop storing a new data block until a next frame period.

A shift register may be included that sequentially stores the predetermined number of data blocks transmitted from the master in the storage unit every first period, and then sequentially reads the data blocks transmitted from the communication partner device and stored in the storage unit every first period from the storage unit and transmits the data blocks to the master.

The shift register may sequentially read data blocks from the communication partner device stored in the storage unit and transmit the data blocks to the master, without transmitting an interrupt signal indicating that a data block from the communication partner device has arrived to the master.

The communication unit may transmit a data block from the master to the communication partner device and receive a data block from the communication partner device in different periods within the frame period using the communication protocol according to time division duplex (TDD) with the communication partner device.

The present disclosure provides a communication system, further including a first communication device and a second communication device that transmit and receive packets with a predetermined communication protocol, in which the first communication device includes:
a first communication unit that adds identification information for identifying a data block to a set of data blocks having a serial signal group conforming to a serial peripheral interface (SPI) transmitted from a master in synchronization with a clock, and transmits the data block to the second communication device within one frame period of a predetermined communication protocol, or adds identification information for identifying each of a plurality of data blocks to the plurality of data blocks having each part of the serial signal group, and transmits the data block to the second communication device in a plurality of frame periods; and
a first storage unit that sequentially stores one or more predetermined number of data blocks transmitted from the master, and then stores data blocks transmitted from a slave via the second communication device in response to the predetermined number of data blocks from the master, and
the second communication device includes a second communication unit that transmits a data block transmitted from the slave in response to the predetermined number of data blocks transmitted from the first communication unit to the first communication device within at least one of the frame periods.

The first communication device may further include a first shift register that sequentially stores the predetermined number of data blocks transmitted from the master in the first storage unit and then sequentially reads the data blocks transmitted from the second communication device and stored in the first storage unit from the first storage unit and transmits the data blocks to the master, and the second communication device may further include:
a second storage unit that stores the predetermined number of data blocks transmitted from the first communication unit and also stores the data blocks transmitted from the slave; and
a second shift register that sequentially stores the predetermined number of data blocks transmitted from the first communication unit in the second storage unit, sequentially reads the data blocks transmitted from the slave and stored in the second storage unit from the second storage unit, and transmits the data blocks to the first communication unit via the second communication unit.

The second shift register may stop a shift operation in a case where there is no data block to be stored in the second storage unit or no data block to be transmitted to the first communication unit.

A clock generator that generates a clock that causes the second shift register to perform a shift operation may be included in a case where the second communication unit receives a data block to be stored in the second storage unit.

The clock may be synchronized with a serial clock included in a serial signal group conforming to the SPI transmitted from the master to the first communication device.

The present disclosure provides a communication method including:
a step of adding identification information for identifying a data block to a set of data blocks having a serial signal group conforming to a serial peripheral interface (SPI) transmitted from a master in synchronization with a clock, and transmitting the data block to a communication partner device within one frame period of a predetermined communication protocol, or adding identification information for identifying each of a plurality of data blocks to the plurality of data blocks having each part of the serial signal group and transmitting the data block to the communication partner device in a plurality of frame periods; and
a step of sequentially storing in a storage unit one or more predetermined number of data blocks transmitted from the master, and then reading a data block transmitted from a slave via the communication partner device in response to the predetermined number of data blocks from the master and stored in the storage unit, to transmit the data block to the master.

BRIEF DESCRIPTION OF DRAWINGS

FIG. 10 is a diagram for describing information included in a transmission packet generated by an ECP in M_SerDes and an ECP in S_SerDes.

MODE FOR CARRYING OUT THE INVENTION

Hereinafter, embodiments of a communication device, a communication system, and a communication method will be described with reference to the drawings. Although main configurations of the communication device, the communication system, and the communication method will be mainly described below, the communication device, the communication system, and the communication method may have configurations and functions that are not illustrated or described. The following description does not exclude configurations and functions that are not illustrated or described.

Basic Configuration

Figure 1:
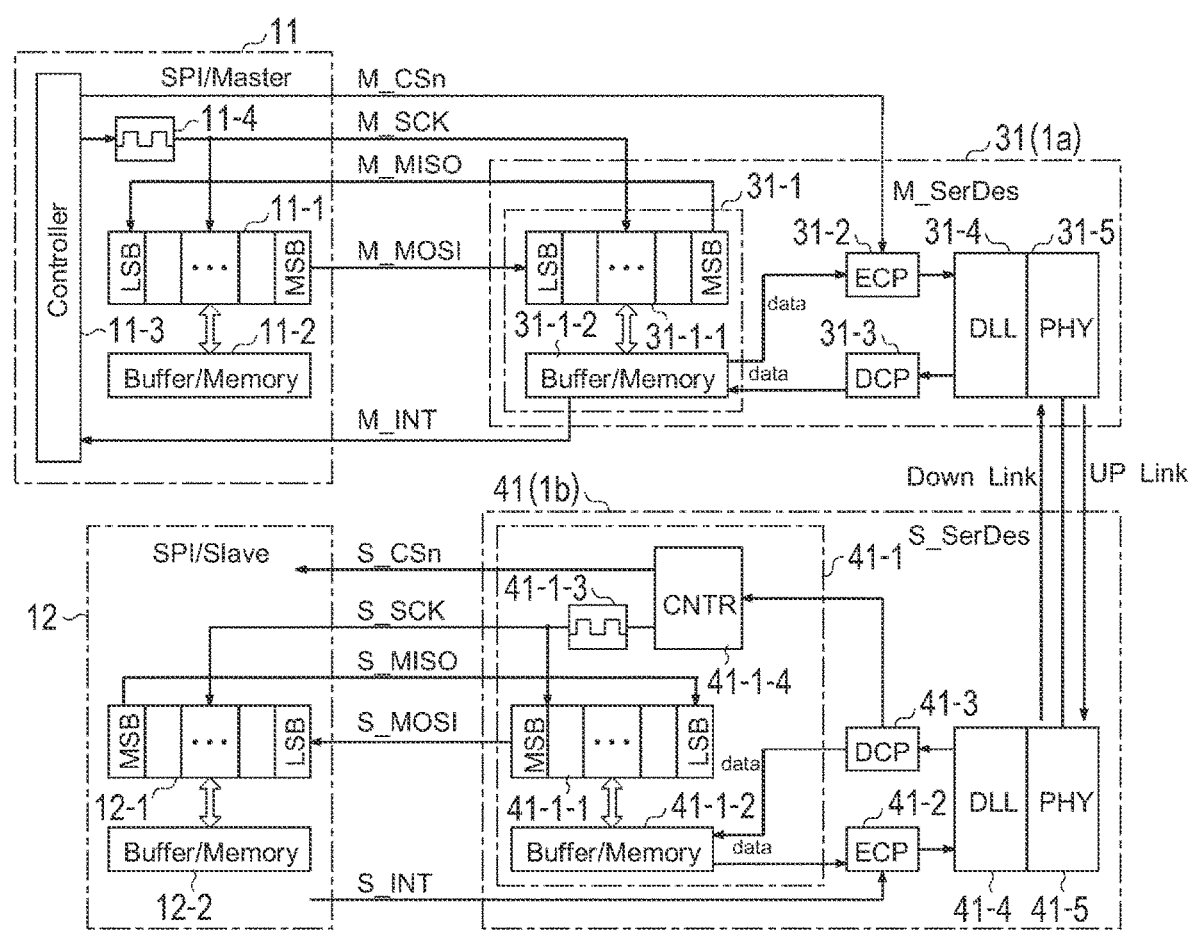
FIG. 1 is a block diagram illustrating a basic configuration of a communication system according to the present disclosure.

FIG. 1 is a block diagram illustrating a basic configuration of a communication system 2 according to the present disclosure. The communication system 2 in FIG. 1 includes an SPI/Master 11, a Master SerDes (M_SerDes 31) 31, an SPI/Slave 12, and a Slave SerDes (S_SerDes) 41. Among them, the M_SerDes 31 corresponds to a communication device 1a, and the S_SerDes 41 corresponds to a communication device 1b.

The SPI/Master 11 and the M_SerDes 31 perform serial communication (which hereinafter may be referred to as SPI communication) conforming to SPI. Similarly, the SPI/Slave 12 and the S_SerDes 41 perform serial communication (SPI communication) conforming to SPI. The M_SerDes 31 and the S_SerDes 41 perform high-speed serial communication by the TDD method. In FIG. 1, a signal transmission path from the M_SerDes 31 to the S_SerDes 41 is referred to as UP Link, and a signal transmission path from the S_SerDes 41 to the M_SerDes 31 is referred to as Down Link. In the SPI communication, serial communication is performed by a protocol conforming to the SPI standard (hereinafter referred to as SPI protocol). Furthermore, in the present description, serial data transmitted and received through SPI communication may be referred to as SPI data. The M_SerDes 31 and the S_SerDes 41 perform high-speed serial communication conforming to, for example, standards of Automotive SerDes Appliance (ASA).

As described later, the M_SerDes 31 includes a communication unit (DLL 31-4) that transmits a serial signal group conforming to a serial peripheral interface (SPI) transmitted from the master (SPI/Master 11) in synchronization with a clock to the communication partner device (S_SerDes 41) as a set of data blocks within one frame period of a predetermined communication protocol, or transmits the serial signal group to the communication partner device (S_SerDes 41) as a plurality of data blocks divided depending on a plurality of frame periods.

Furthermore, the S_SerDes 41 includes a communication unit (DLL 41-4) that transmits a serial signal group conforming to SPI transmitted from the slave (SPI/Slave 12) to the communication partner device (M_SerDes 31) as a set of data blocks within one frame period of a predetermined communication protocol or transmits the serial signal group to the communication partner device (M_SerDes 31) as a plurality of data blocks divided depending on a plurality of frame periods, in synchronization with a clock generated on the basis of clock frequency information included in a packet from the communication partner device (M_SerDes 31).

Figure 2:
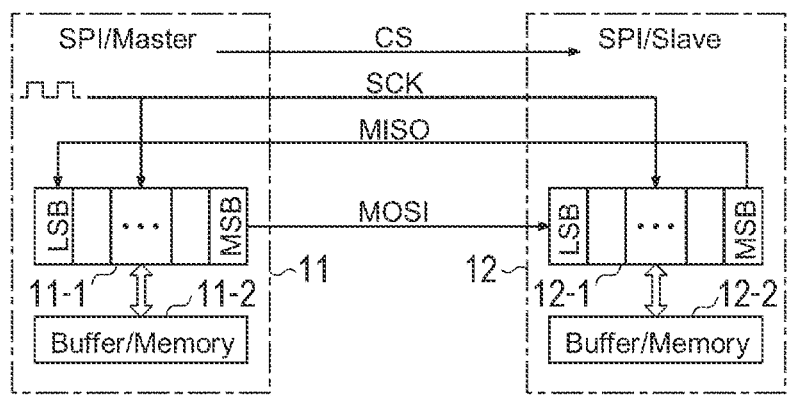
FIG. 2 is a block diagram of a portion related to SPI communication between SPI/Master and SPI/Slave.

FIG. 2 is a block diagram of a portion related to SPI communication between the SPI/Master 11 and the SPI/Slave 12. Note that FIG. 2 illustrates an example in which the SPI/Master 11 and the SPI/Slave 12 directly perform serial communication conforming to SPI in order to simplify the description.

As shown in FIG. 2, the SPI/Master 11 has a shift register 11-1 and a buffer/memory 11-2. Similarly, the SPI/Slave 12 has a shift register 12-1 and a buffer/memory 12-2.

The shift register 12-1 in the SPI/Slave 12 operates in synchronization with a clock SCK supplied from the SPI/Master 11. The shift register 11-1 in the SPI/Master 11 sequentially outputs serial data from a most significant bit (MSB) side in synchronization with SCK. The output serial data is input to a least significant bit (LSB) side of the shift register 12-1 in the SPI/Slave 12 via a MOSI pin. Serial data output from the MSB side of the shift register 12-1 in the SPI/Slave 12 is input to the LSB side of the shift register 11-1 in the SPI/Master 11 via the MISO pin. Data held by the shift register 11-1 in the SPI/Master 11 can be stored in the buffer/memory 11-2. Furthermore, the shift register 11-1 can hold data stored in the buffer/memory 11-2. Similarly, data held by the shift register 12-1 in the SPI/Slave 12 can be stored in the buffer/memory 12-2. Furthermore, the shift register 12-1 can hold data stored in the buffer/memory 12-2.

Figure 3:
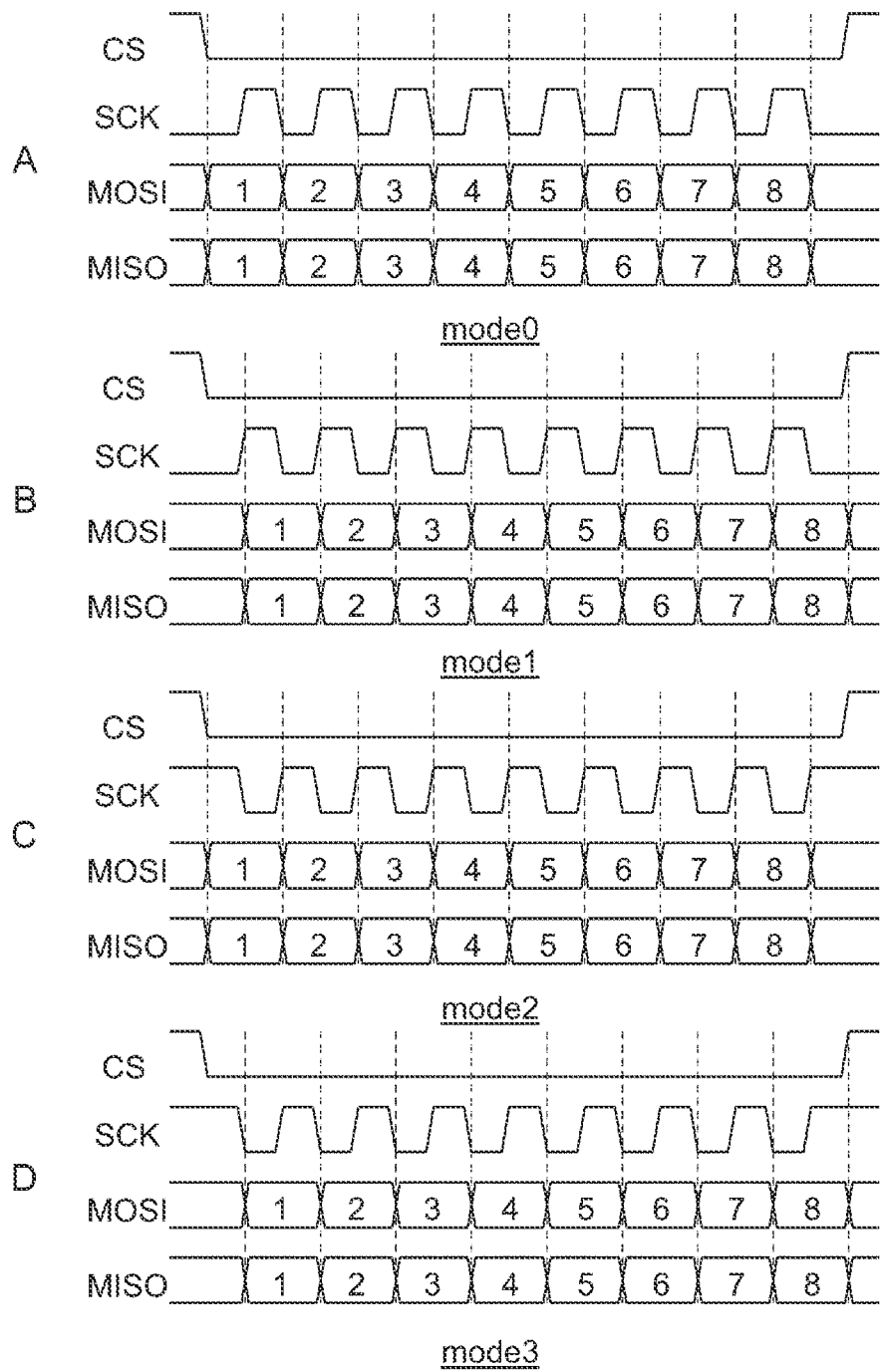
FIG. 3 is a basic signal waveform diagram of the SPI protocol.

FIG. 3 is a basic signal waveform diagram of the SPI protocol. In the SPI protocol, there are four combinations of a polarity of SCK when a slave select signal (CS signal) output by the SPI/Master 11 is idle (high level in FIG. 3) and an edge (rising edge or falling edge) of the clock (SCK) that latches data when the CS signal enters an active state (low level in FIG. 3). These four combinations are called SPI modes. The SPI/Master 11 can arbitrarily select one of the four SPI modes. The SPI/Master 11 knows in advance an SPI mode that can be supported by the SPI/Slave 12, and needs to select a mode corresponding thereto.

FIGS. 3A to 3D are signal waveform diagrams of four SPI modes. In SPI mode=0 illustrated in FIG. 3A, the SCK is Low when the CS signal is idle, and data is held when the SCK rises. In SPI mode=1 illustrated in FIG. 3B, the SCK is Low when the CS signal is idle, and data is held when the SCK falls. In SPI mode=2 illustrated in FIG. 3C, the SCK is High when the CS signal is idle, and data is held when the SCK falls. In SPI mode=3 illustrated in FIG. 3D, the SCK is High when the CS signal is idle, and data is held when the SCK rises.

Since the frequency of the SCK is not defined in the SPI protocol and differs for each individual device that performs SPI communication, the SPI/Master 11 selects the frequency of the SCK for each individual device that performs SPI communication. Therefore, the SPI/Master 11 needs to know in advance the SCK frequencies that can be supported by each device that performs SPI communication.

Hereinafter, a communication method using the SPI protocol will be described. In the example of FIG. 2, communication based on the SPI protocol is performed between the SPI/Master 11 and the SPI/Slave 12. One or more SPI/Slaves 12 may be connected to the SPI/Master 11. In a case where a plurality of SPI/Slaves 12 is connected to the SPI/Master 11, the SPI/Master 11 has a plurality of CS signals corresponding to the plurality of SPI/Slaves 12, and can perform communication by selecting, with the corresponding CS signal, a Slave to be communicated. The CS signal for the SPI/Master 11 to select the SPI/Slave 12 to communicate with is included in SPI control information as described later. The SPI/Master 11 includes the SPI control information in SPI data and transmits the SPI data to M_SerDes 31.

In a case where SPI communication is performed, the SPI/Master 11 sets to the active state (Low in FIGS. 3A to 3D) the CS signal connected to an SPI/Slave 12 to be communicated with. In the present description, setting various signals to an active state may be referred to as assertion, and setting various signals to an idle state may be referred to as deassertion.

The SPI/Master 11 and the SPI/Slave 12 transfer, from the respective buffer/memories 11-2 and 12-2 to the shift registers 11-1 and 12-1, data to be transferred. The SPI/Master 11 generates an SCK and supplies it to its own shift register 11-1, and also supplies the SCK to the shift register 12-1 in the SPI/Slave 12. Each of the shift registers 11-1 and 12-1 shifts the held data by 1 bit by toggling of the SCK. When the SCK toggles by the number of stages of the shift registers 11-1 and 12-1, the data of the shift registers 11-1 and 12-1 is switched. Thereafter, the SPI/Master 11 makes the CS signal transition to an idle state (High in FIGS. 3A to 3D). The SPI/Master 11 and the SPI/Slave 12 can acquire data from the buffer/memories 11-2 and 12-2 by transferring the data of the shift registers 11-1 and 12-1 at that time to the buffer/memories 11-2 and 12-2, whereby the SPI communication is terminated.

FIG. 2 shows an example in which the SPI/Master 11 and the SPI/Slave 12 directly perform SPI communication, but in FIG. 1, the M_SerDes 31 and the S_SerDes 41 are arranged between the SPI/Master 11 and the SPI/Slave 12. In FIG. 1, the SPI/Master 11 and the M_SerDes 31 perform SPI communication, the M_SerDes 31 and the S_SerDes 41 perform serial communication by the TDD method, and the SPI/Slave 12 and the S_SerDes 41 perform SPI communication.

Figure 4:
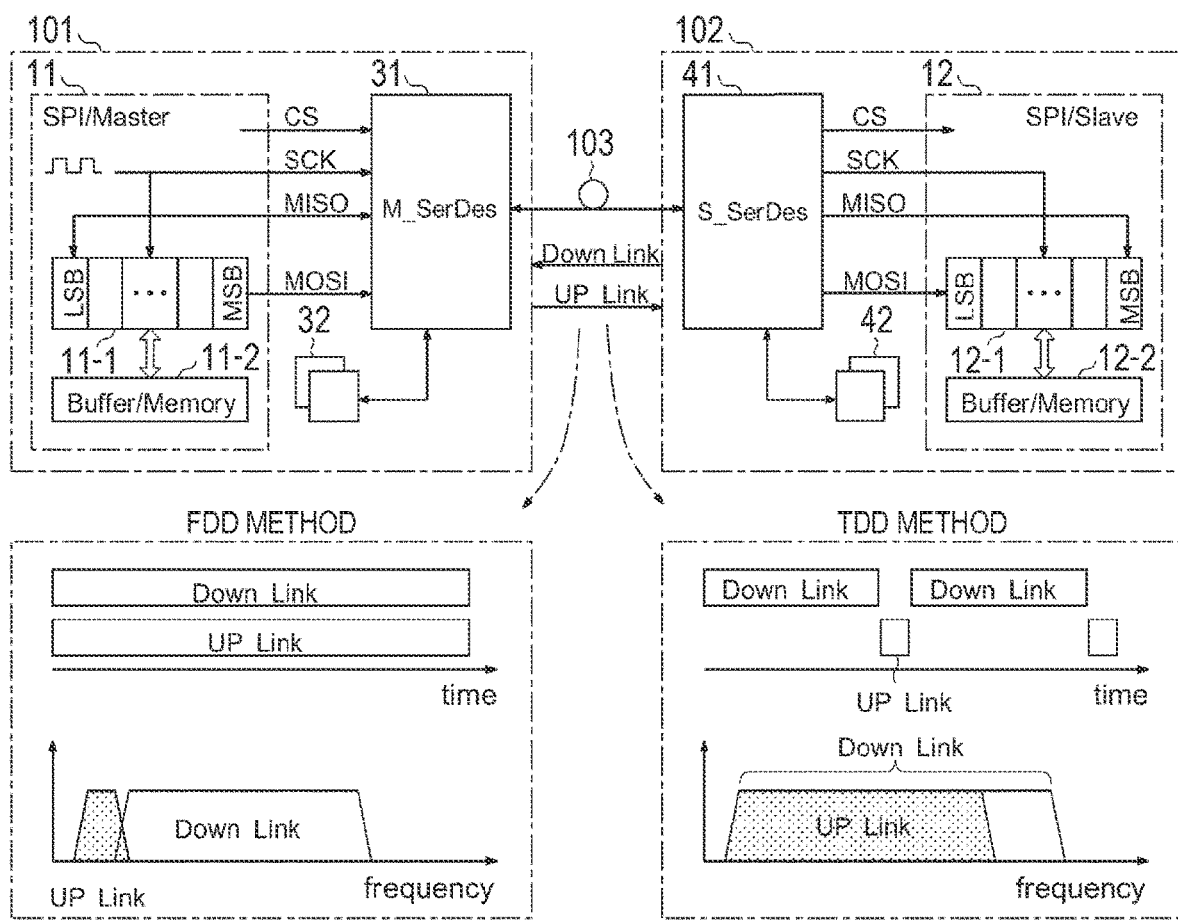
FIG. 4 is a diagram illustrating a TDD method performed between M_SerDes and S_SerDes in FIG. 1.

FIG. 4 is a diagram illustrating a TDD method performed between the M_SerDes 31 and the S_SerDes 41 in FIG. 1. FIG. 4 illustrates a simplified internal configuration of the SPI/Master 11 and the SPI/Slave 12 illustrated in FIG. 1. Furthermore, FIG. 4 illustrates an example in which peripheral devices 32 and 42 are connected to the M_SerDes 31 and the S_SerDes 41, respectively.

The M_SerDes 31 and the S_SerDes 41 are connected to each other by, for example, a cable 103 of several meters to 10-plus meters. Through this cable 103, the M_SerDes 31 and the S_SerDes 41 perform high-speed serial communication. Furthermore, a plurality of sets each including two devices having configurations similar to those of the M_SerDes 31 and the S_SerDes 41 in FIG. 4 may be provided, and high-speed serial communication may be performed every set. The M_SerDes 31 and the S_SerDes 41 in FIG. 4 can be widely applied to applications, for example, an in-vehicle camera module, for transmitting and receiving a large amount of data.

The M_SerDes 31 and the S_SerDes 41 perform high-speed serial communication by the TDD method. The timing and the frequency band of the TDD method are illustrated in the lower right of FIG. 4. In the TDD method, as illustrated on the right side of FIG. 4, one signal transmission period in the upstream direction and one signal transmission period in the downstream direction are provided so as not to temporally overlap each other within one TDD cycle. The example of the TDD timing chart in FIG. 4 illustrates an example in which the signal transmission period of the signal in the upstream direction (referred to as UP Link) from the M_SerDes 31 to the S_SerDes 41 is extremely shorter than the signal transmission period of the signal in the downstream direction (referred to as Down Link) from the S_SerDes 41 to the M_SerDes 31, that is, an example in which a signal ratio of UP Link is extremely smaller than that of Downlink. For example, in a case where a video signal captured by a sensor in the S_SerDes 41 is transmitted to the M_SerDes 31, the signal ratio is as illustrated in the TDD timing chart of FIG. 4.

On the right side of FIG. 4, a frequency band used for signal transmission of the UP Link and a frequency band used for signal transmission of the Down Link in the TDD method are illustrated. As illustrated in the drawing, in the TDD method, a part of the frequency band overlaps in the UP Link signal transmission and the Down Link signal transmission. For example, in a case where a video signal captured by a sensor in the S_SerDes 41 is transmitted to the M_SerDes 31, Down Link signal transmission in the downstream direction having a large signal amount requires a wider frequency band than UP Link signal transmission in the upstream direction, and thus, is performed using a wider frequency band including a frequency band used for UP Link signal transmission in the upstream direction. In the TDD method, since the signal transmission period in the Down Link in the downstream direction does not overlap with the signal transmission period in the UP Link in the upstream direction, an echo cancellation circuit for separating both signals is unnecessary.

It is assumed that the M_SerDes 31 and the S_SerDes 41 according to the present embodiment perform signal transmission by the TDD method, but signal transmission may be performed by the FDD method in some cases. Timing and a frequency band of the FDD method are illustrated in the lower right of FIG. 4. In the FDD method, a frequency band used for signal transmission from the M_SerDes 31 to the S_SerDes 41 is different from a frequency band used for signal transmission from the S_SerDes 41 to the M_SerDes 31. Therefore, signal transmission from the M_SerDes 31 to the S_SerDes 41 and signal transmission from the S_SerDes 41 to the M_SerDes 31 can be performed at the same timing, and signal transmission in the upstream direction and signal transmission in the downstream direction can be performed using the entire period within one FDD cycle.

Furthermore, in the FDD method, the signal transmission in the upstream direction having a large signal amount is performed using a wide frequency band on the high frequency side. The signal transmission in the downstream direction with a small signal amount is performed using a narrow frequency band on the low frequency side. In the lower left example of FIG. 4, in order to increase the utilization efficiency of the frequency, the frequency band used in the signal transmission in the upstream direction and the frequency band used in the signal transmission in the downstream direction are partially overlapped. Furthermore, as illustrated in the lower left of FIG. 4, the signal transmission section in the upstream direction and the signal transmission section in the downstream direction in the time domain completely overlap each other. The presence of these overlaps requires an echo cancellation circuit. The echo cancellation circuit is a circuit that accurately separates a signal in the upstream direction and a signal in the downstream direction.

In the TDD bidirectional communication method, unlike the FDD bidirectional communication, it is necessary to transmit a signal of a full-duplex communication method in which data is exchanged simultaneously between the master device and the SPI slave device in synchronization with SCK, in a half-duplex communication method in which an upstream signal (UP Link) and a downstream signal (Down Link) between communication devices perform communication while being switched every allocated time, and particularly, it is necessary for the SPI master device 11 to know and read that a read signal (MISO in FIG. 3) from the Slave side has reached the M_SerDes 31 via the S_SerDes 41 using some means.

In FIG. 4, when the read data S_MISO from the SPI/Slave 12 reaches the buffer/memory 31-1-2 in the M_SerDes 31 via the S_SerDes 41 and the cable 103, the buffer/memory 31-1-2 notifies the SPI/Master 11 device 11 of the arrival of the read data S_MISO by the interrupt signal M_INT 11-11, and the SPI/Master 11 device 11 that has received the notification supplies M_SCK, which is an SPI clock, to the M_SerDes 31, and the M_MISO data is read from the shift register 31-1-1 in synchronization with the M_SCK. However, in this method, the interrupt signal M_INT is required, and therefore a dedicated signal pin is required, which causes an increase in cost.

Hereinafter, an example will be described in which the M_SerDes 31 and the S_SerDes 41 perform high-speed serial communication by the TDD method, and the M_SerDes 31 performs serial communication conforming to SPI with the SPI/Master 11, and the S_SerDes 41 performs serial communication conforming to SPI with the SPI/Slave 12.

Since serial communication based on the TDD method instead of SPI is performed between the M_SerDes 31 and the S_SerDes 41, it is necessary to perform protocol conversion inside the M_SerDes 31 and the S_SerDes 41. Furthermore, while serial communication by SPI is a full-duplex communication method, serial communication by TDD method is a half-duplex communication method, and thus data from the SPI/Master 11 and the SPI Slave cannot be transmitted and received by TDD method at their original timings.

Hereinafter, a configuration of the communication system 2 in FIG. 1 will be described in detail. As shown in FIG. 4, the SPI/Master 11 in FIG. 1 includes a controller 11-3 and an SCK generator 11-4 in addition to the shift register 11-1 and the buffer/memory 11-2.

The controller 11-3 supplies a slave select signal (CS signal) for activating SPI communication to the M_SerDes 31 via an M_CSn pin. The CS signals are provided as many as the number of devices that perform SPI communication with the SPI/Master 11. For example, in FIG. 1, different M_CSn pins are assigned to the M_SerDes 31, the S_SerDes 41, and the SPI/Slave 12. In the present description, a pin that outputs the CS signal output from the SPI/Master 11 may be referred to as M_CSn (x). For example, M_CSn (0) is assigned to the M_SerDes 31, and M_CSn (1) is assigned to the SPI/Slave 12.

The controller 11-3 controls operation of the SCK generator 11-4. The SCK generator 11-4 outputs SCK when any CS signal is in an active state. The shift register 11-1 performs a shift operation in synchronization with SCK.

The controller 11-3 detects that the SPI/Slave 12 has output an interrupt signal S_INT by the interrupt signal M_INT from the M_SerDes 31, and starts SPI communication of the next frame with the interrupt signal M_INT as a trigger. Alternatively, in a case where the controller 11-3 itself wants to transmit SPI data, SPI communication is similarly started (a time t1 of M_CSn (1) in FIG. 5 as described later).

The M_SerDes 31 is connected to the SPI/Master 11. The M_SerDes 31 has an SPI block 31-1 in order to perform data communication with the SPI/Master 11 according to the SPI protocol. Similarly, the SPI block 31-1 has the shift register 31-1-1 and the buffer/memory 31-1-2. When the controller 11-3 in the SPI/Master 11 activates the CS signal corresponding to the M_SerDes 31 and the SCK generator 11-4 outputs SCK, the shift register 31-1-1 outputs SPI data in synchronization with the SCK and supplies the SPI data to the SPI/Master 11 via the MISO pin. Furthermore, the shift register 31-1-1 fetches SPI data output from the SPI/Master 11 via the MOSI pin in synchronization with the SCK.

When the CS signal enters an idle state, the controller 11-3 causes the SCK generator 11-4 to stop the output of SCK. Therefore, the shift register 31-1-1 holds the state immediately before SCK is stopped.

When the CS signal transitions to an idle state, the SPI block 31-1 in M_SerDes 31 transfers all the data in the shift register 31-1-1 to the buffer/memory 31-1-2. Therefore, the data transfer process by the SPI protocol from the SPI/Master 11 to the M_SerDes 31 ends.

Note that the data transfer from the shift register 31-1-1 in the M_SerDes 31 to the buffer/memory 31-1-2 depends on the amount of data that the SPI/Master 11 wants to transfer and the data capacity of the shift register 31-1-1. Therefore, in a case where the data in the shift register 31-1-1 may overflow while the CS signal is in an active state, data omission can be prevented by transferring the data in the shift register 31-1-1 to the buffer/memory 31-1-2 before the overflowing.

In addition, the M_SerDes 31 includes a packet encoder (ECP) 31-2, a packet decoder (DCP) 31-3, a DLL 31-4, and a PHY layer block (PHY) 31-5. The ECP 31-2 in the M_SerDes 31 converts the SPI data stored in the buffer/memory 31-1-2 into a packet (SPI packet) conforming to the TDD method. The DLL 31-4 combines the SPI packets generated by the ECP 31-2 with other transmission packets other than the SPI packets to generate an UP Link packet. The PHY 31-5 transmits the UP Link packet to the S_SerDes 41 via the UP Link.

The S_SerDes 41 in FIG. 1 is connected to the SPI/Slave 12. The S_SerDes 41 has an SPI block 41-1 in order to transmit and receive data to and from the SPI/Slave 12 according to the SPI protocol. The SPI block 41-1 includes a controller (CNTR) 41-1-4, an SCK generator 41-1-3, a shift register 41-1-1, and a buffer/memory 41-1-2. The controller 41-1-4 controls the timing and frequency of the SCK output from the SCK generator 41-1-3 on the basis of SPI control information from the SPI/Master 11. When the controller 41-1-4 activates the CS signal corresponding to the SPI/Slave 12 and the SCK generator 41-1-3 outputs SCK, the shift register 41-1-1 outputs SPI data in synchronization with the SCK and supplies the SPI data to the SPI/Slave 12 via the S_MOSI pin. Furthermore, SPI data output from the SPI/Slave 12 via the S_MISO pin is input to the shift register 41-1-1 in synchronization with SCK. In addition, the S_SerDes 41 includes a packet encoder (ECP) 41-2, a packet decoder (DCP) 41-3, a DLL 41-4, and a PHY layer block (PHY) 41-5. The ECP 41-2 in the S_SerDes 41 converts the SPI data stored in the buffer/memory 41-1-2 into a packet (SPI packet) conforming to the TDD method. The DLL 41-4 combines the SPI packets generated by the ECP 41-2 with other transmission packets other than the SPI packets to generate a Down Link packet. The PHY 41-5 transmits the Down Link packet to the M_SerDes 31 via the Down Link.

Figure 5:
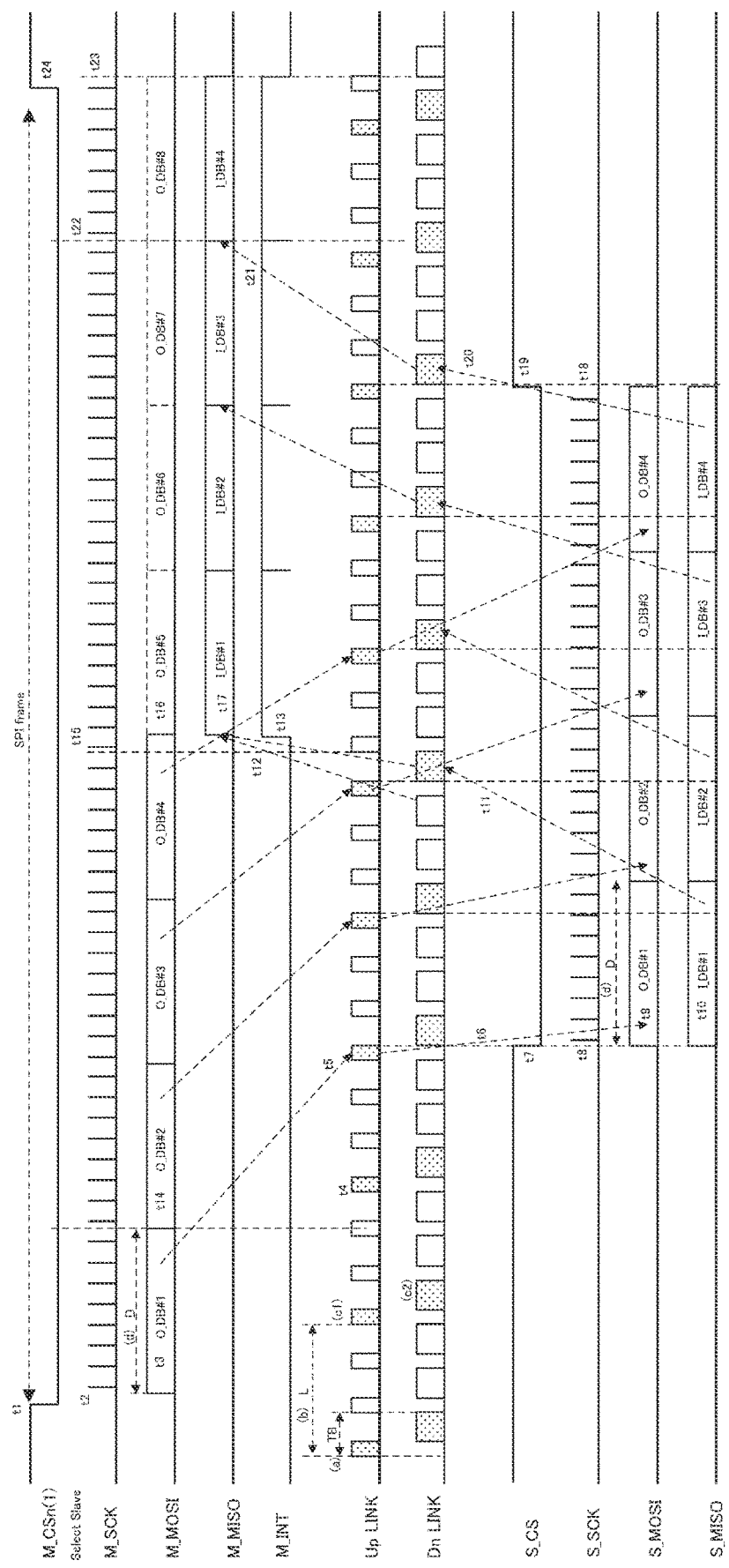
FIG. 5 is a timing chart of the communication system in FIG. 1.

FIG. 5 is a timing chart of the communication system 2 in FIG. 1. In FIG. 5, a TDD burst period when the M_SerDes 31 and the S_SerDes 41 perform serial communication by the TDD method is TB, and one frame period of TDD is L. Furthermore, the SPI data block length is D. The SPI data block is configured by N-byte SPI data, and all the N-byte data is transmitted as a 1-TDD burst signal. The 1-TDD burst signal is a serial signal transmitted in one TDD burst period TB.

Each of the UP Link packet and the Down Link packet is transmitted as one TDD burst signal in one TDD burst period. The example of FIG. 5 illustrates an example in which there are four TDD burst periods in one frame period of TDD, and one TDD burst signal (UP Link packet) including an SPI data block is transmitted in one TDD burst period.

In order to transmit all of the SPI data transmitted from the SPI/Master 11 to the SPI/Slave 12, the transmission capacity of the transmission slot for SPI allocated in the TDD burst period needs to be equal to or larger than the transmission capacity of the SPI data. Therefore, a relationship between the block length D of the SPI data and the period L of the TDD burst signal transmitting the SPI data needs to satisfy D≥L.

The timing at which the SPI data is generated is irrelevant to the TDD burst signal because the SPI/Master 11 determines the timing depending on the convenience of its own application.

Therefore, if L is too short with respect to D, that is, if the number of allocations of TDD bursts for transmitting SPI data is too large, the number of TDD bursts for not transmitting SPI data increases, and the entire transmission capacity is wasted. Therefore, the relationship between the SPI data block time length D and the period L of the TDD burst signal for transmitting SPI data desirably satisfies D≥L>D/2.

Figure 6A:
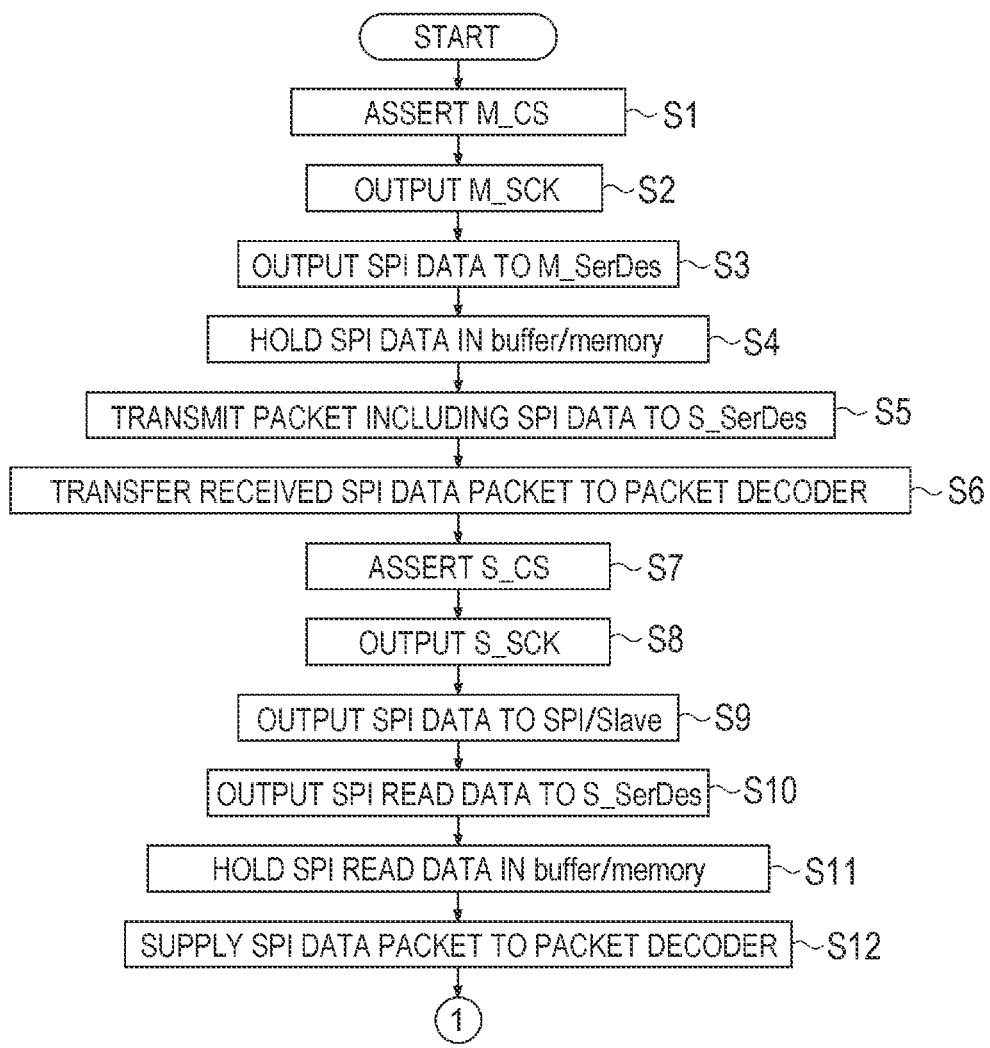
FIG. 6A is a flowchart illustrating a processing operation of the communication system in FIG. 1.
Figure 6B:
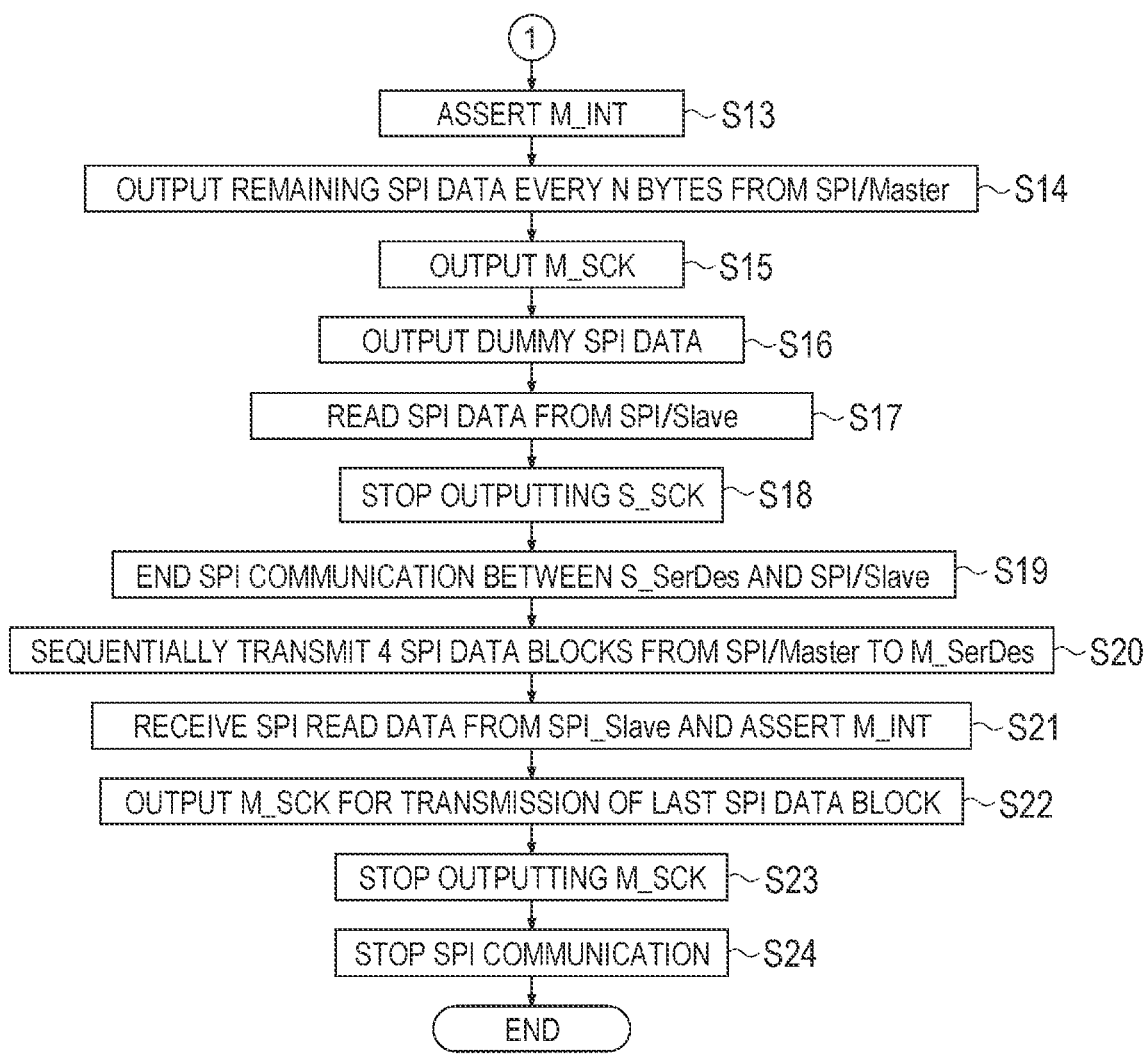
FIG. 6B is a flowchart following FIG. 6A.

FIGS. 6A and 6B are flowcharts illustrating processing operations of the communication system 2 in FIG. 1. Hereinafter, the operation of the communication system 2 of FIG. 1 will be described on the basis of the flowcharts of FIGS. 6A and 6B with reference to the timing chart of FIG. 5.

First, the SPI/Master 11 asserts a chip select signal CS (M_CS) to start SPI communication (step S1, time t1), and starts clock output of the SCK (M_SCK) for SPI communication (step S2, time t2).

The SPI/Master 11 outputs to M_SerDes 31 (step S3, time t3) an N-byte SPI data block (O_DB #1) to be transmitted in synchronization with M_SCK. The M_SerDes 31 temporarily holds the received SPI data block (O_DB #1) in the buffer/memory 31-1-2 (step S4, time t4). The buffer/memory 31-1-2 does not transfer the SPI data block (O_DB #1) but keeps it as it is during the first TDD burst period of the UP link allocated to transmit the SPI data scheduled by the DLL 31-4. This holding period is provided to generate a minimum delay time L for continuously reading and writing the SPI data with the SPI/Slave 12 from and to the SPI/Master 11 via the M_SerDes 31 and the S_SerDes 41. The delay time L is the same as one frame period L of TDD.

The buffer/memory 31-1-2 holds the SPI data block (O_DB #1) and then transfers the encapsulated SPI data block (O_DB #1) via the packet encoder 31-2 that performs an encapsulation process for transmitting SPI data during the TDD burst period of the UP link allocated for transmitting the second most recent SPI data (step S5, time t5). In the encapsulated SPI information, information indicating how many blocks the SPI data is configured by is described. FIG. 5 illustrates an example in which a packet including four SPI data blocks is transmitted. The M_SerDes 31 transmits the UP link packet to the S_SerDes 41 through the cable 103.

The S_SerDes 41 decodes the UP link packet including the received SPI data block (O_DB #1) via the PHY 41-5 and the DLL 41-4, and transfers the SPI data packet (SPI data packet) to the packet decoder 41-3 (step S6, time t6). The packet decoder 41-3 decodes the SPI data packet and passes the decoded SPI data block (O_DB #1) to the SPI block 41-1.

The controller 41-1-4 of the SPI block 41-1 in the S_SerDes 41 asserts CS (S_CS) instructing the SPI/Slave 12 to start SPI communication for transferring the SPI data block (O_DB #1) (step S7, time t7).

The SPI block 41-1 of the S_SerDes 41 causes the SPI/Slave 12 to start the clock output of the SCK (S_SCK) of SPI for transferring the SPI data block (O_DB #1) (step S8, time t8). The frequency of S_SCK is the same as SCK (M_SCK) on the SPI/Master 11 side.

The SPI block 41-1 of the S_SerDes 41 outputs an N-byte SPI data block (O_DB #1) to the SPI/Slave 12 in synchronization with S_SCK (step S9, time t9).

The SPI/Slave 12 synchronizes SPI read data (I_DB #1) with S_SCK (S_SCK) at the same time, and outputs the same N bytes as the write data (O_DB #1) (step S10, time t10).

The S_SerDes 41 temporarily holds the received N-byte SPI read data (I_DB #1) in the buffer/memory 41-1-2 (step S11, time t11). The buffer/memory 41-1-2 holds the N-byte SPI data block (I_DB #1) and then transfers the encapsulated SPI data block (I_DB #1) via the packet encoder 41-2 that performs an encapsulation process for transmitting SPI data during the TDD burst period of the Down link allocated for transmitting the first SPI data scheduled by the DLL 41-4. The S_SerDes 41 transmits the Down link packet to the M_SerDes 31 through the cable 103.

The M_SerDes 31 decodes the Down link packet including the received SPI data block (I_DB #1) via the PHY 31-5 and the DLL 31-4, and supplies the SPI data packet to the packet decoder 31-3 (step S12, time t12). The packet decoder 31-3 decodes the SPI data packet and passes the decoded SPI data block (I_DB #1) to the SPI block 31-1.

Upon receiving the decoded SPI data block (I_DB #1), the buffer/memory 31-1-2 in the SPI block 31-1 of the M_SerDes 31 asserts an interrupt signal M_INT indicating that there is valid SPI data to be transmitted to the SPI/Master 11 (step S13, time t13). This interrupt signal M_INT is sent to the SPI/Master 11.

Upon receiving the interrupt signal M_INT after outputting the SPI data block (O_DB #1), the SPI/Master 11 continues outputting the remaining SPI data to be transmitted every N bytes in synchronization with M_SCK (step S14, time t14). The example of FIG. 5 shows that the data continues to be output up to the SPI data block (O_DB #4). The M_SerDes 31 and the S_SerDes 41 repeat the processing in steps S15 to S14 described above for each N-byte SPI data block (O_DB #X).

Upon receiving the interrupt signal M_INT indicating that there is valid SPI data from the M_SerDes 31, the SPI/Master 11 performs the clock outputs of SCK (M_SCK) for N bytes in order to read the SPI data block (I_DB #1) (step S15, time t15).

In the example of FIG. 5, since the written SPI data is of 4N bytes, a dummy SPI data block (O_DB #5) is output in order to read the read SPI data block (I_DB #1), but this dummy SPI data block (O_DB #5) is not transmitted to the S_SerDes 41 (step S16, time t16).

The SPI/Master 11 outputs the dummy SPI data block (O_DB #5) by SCK (M_SCK) and reads the read data (I_DB #1) from the SPI/Slave 12 (step S17, time t17). Writing and reading of the SPI data for N bytes from the SPI/Master 11 to the SPI/Slave 12 are completed through the above operation.

After receiving the SPI data for the number of blocks described in the SPI data packet (four blocks in FIG. 5), the controller 41-1-4 in the SPI block 41-1 of the S_SerDes 41 stops the clock output of S_SCK to indicate to the SPI/Slave 12 that the SPI communication is ended (time S18, time t18). Furthermore, deasserting S_CS ends the SPI communication between the S_SerDes 41 and the SPI/Slave 12 (step S19, time t19).

The S_SerDes 41 performs the same processing as in step S11 on the SPI read data (I_DB #X) for four blocks received from the SPI/Slave 12, and transmits the SPI read data to the M_SerDes 31 via a Down link (step S20, time t20).

The M_SerDes 31 performs the same processing as in steps S12 and S13 on the received SPI data blocks (I_DB #2 to #4) (step S21, time t21).

Upon receiving the interrupt signal M_INT indicating that there is valid SPI data from the M_SerDes 31, the SPI/Master 11 performs the clock outputs of SCK (M_SCK) for N bytes in order to read the SPI data block (I_DB #4), which is the last block (step S22, time t22).

After the controller 11-3 in the SPI/Master 11 receives SPI data for a desired number of blocks (in FIG. 5, four blocks), the M_SCK stops clock output to indicate to the M_SerDes 31 that SPI communication is ended (step S23, time t23). Furthermore, deasserting M_CSn (1) ends the SPI communication between the SPI/Master 11 and the M_SerDes 31 (step S24, time t24).

In the relationship between the time t2 at which the SPI/Master 11 starts SPI communication and the generation timing (time t5) of the TDD burst period allocated to transmit SPI data shown in FIG. 5, after the SPI read data (I_DB #1) is returned from the SPI/Slave 12 to the SPI/Master 11 with respect to the SPI data block (O_DB #1) to be written into the SPI/Slave 12 by the SPI/Master 11, the timing at which the SPI/Master 11 can read the SPI read data is after five SPI data blocks (time t16, 0_DB #5).

Figure 7:
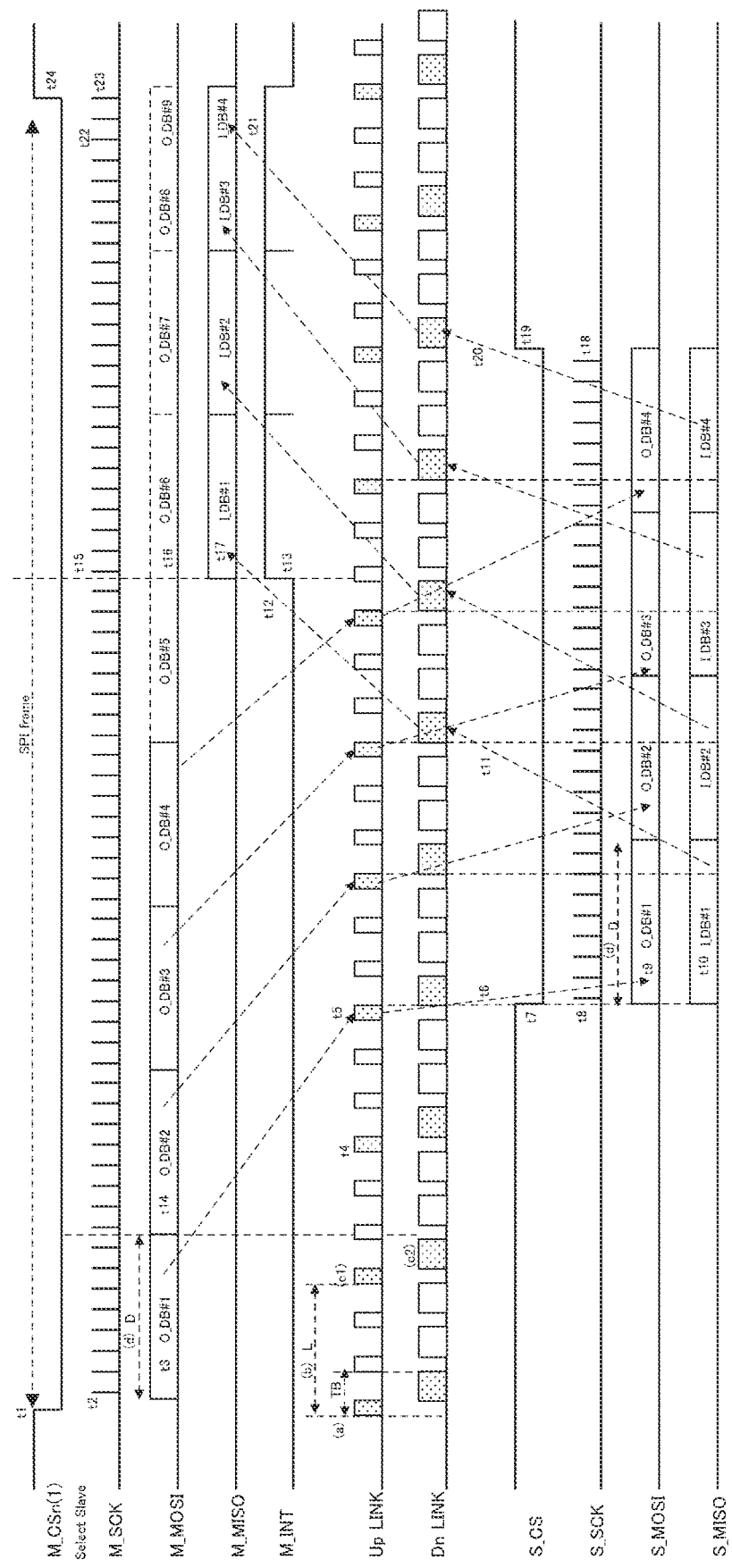
FIG. 7 is a timing chart of a modification example of FIG. 5.

FIG. 7 is a timing chart of a modification example of FIG. 5. FIG. 7 illustrates an example in which a phase relationship between a communication start timing t2 of the SPI data and a timing t5 of the TDD burst period in which the SPI data is first transmitted is different from that in FIG. 5.

In the case of FIG. 7, after the SPI read data (I_DB #1) from the SPI/Slave 12 to the SPI/Master 11 is returned with respect to the SPI data block (O_DB #1) written by the SPI/Master 11 into the SPI/Slave 12, the timing at which the SPI/Master 11 can read the SPI read data is after six SPI data blocks ((16), O_DB #6).

As shown in FIGS. 5 and 7, the timing at which the SPI/Master 11 can read the SPI read data from the SPI/Slave 12 differs depending on the relationship between the SPI data communication start timing and the TDD burst timing.

Therefore, the M_SerDes 31 needs an interrupt signal (M_INT in FIG. 1) for indicating to the SPI/Master 11 that the SPI data from the SPI/Slave 12 has arrived.

However, as described above, since the interrupt signal requires a physical pin, the interrupt signal may cause an increase in cost as described above. The communication system 2 according to first and second embodiments described below is characterized in that the communication system 2 learns the timing at which the SPI/Master 11 receives data from the SPI/Slave 12 without requiring an interrupt signal, and transmits the next SPI data to the M_SerDes 31.

First Embodiment

Figure 8:
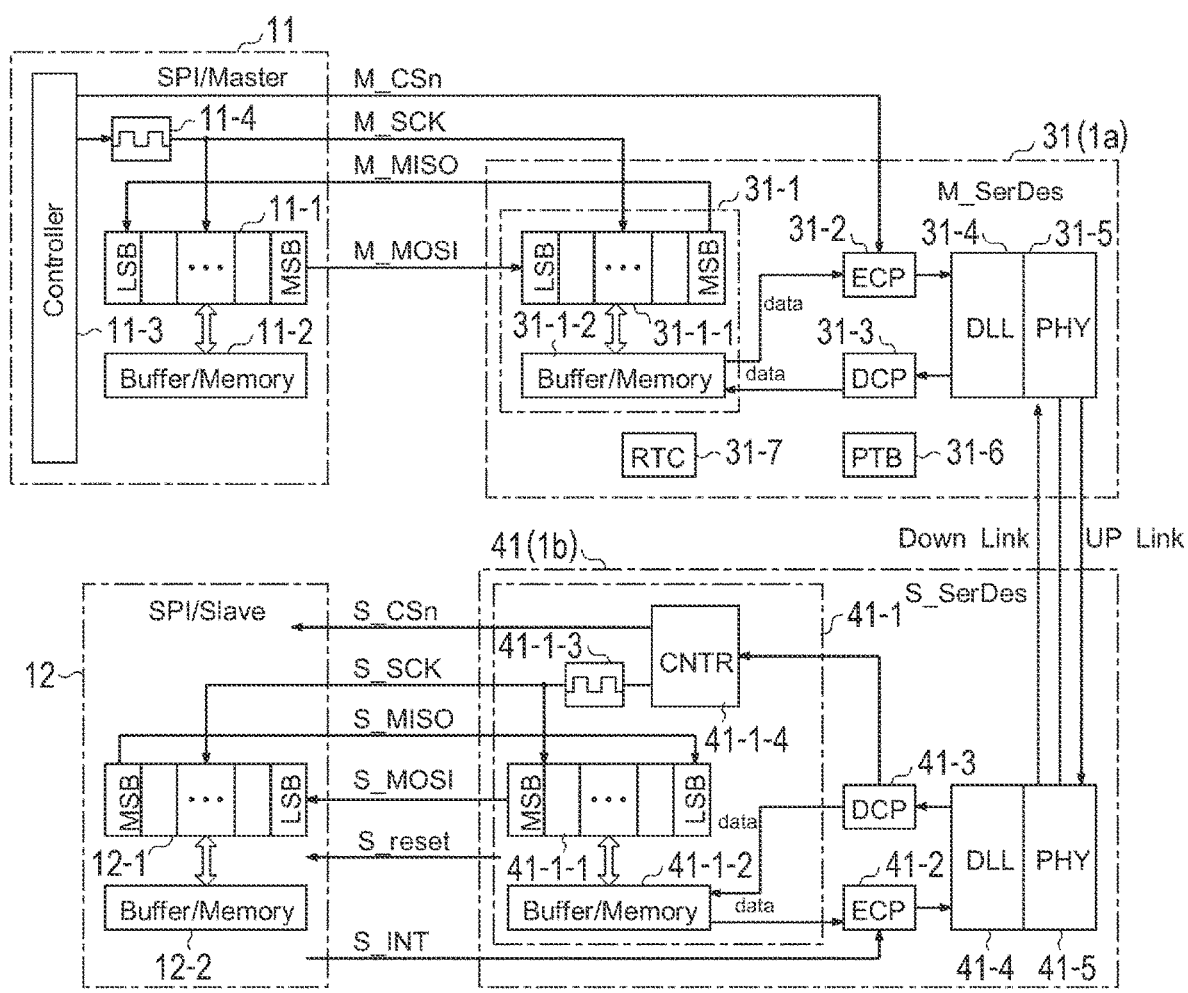
FIG. 8 is a block diagram illustrating a schematic configuration of a communication system according to a first embodiment.

FIG. 8 is a block diagram illustrating a schematic configuration of a communication system 2 according to the first embodiment. In FIG. 8, configurations common to those in FIG. 1 are denoted by the same reference numerals, and differences will be mainly described below. The communication system 2 of FIG. 8 includes an SPI/Master 11, an M_SerDes 31, an S_SerDes 41, and an SPI/Slave 12 configured similarly to FIG. 1. The M_SerDes 31 in the communication system 2 in FIG. 8 includes a precision time base (PTB) counter (first counter) 31-6 and a real time counter (RTC) (second counter) 31-7, in addition to the internal configuration of the M_SerDes 31 in FIG. 1.

The PTB counter 31-6 measures a TDD cycle period (frame period) on the basis of time information PTB shared between the M_SerDes 31 and the S_SerDes 41 in the communication system 2. The RTC 31-7 counts the SCK supplied by the SPI/Master 11 and measures the timing of reading the SPI data from the SPI/Slave 12.

The M_SerDes 31 in FIG. 8 controls the timing at which the data block from the SPI/Master 11 stored in the buffer/memory 31-1-2 is transmitted to the DLL 31-4 and the timing at which the data block from the SPI/Slave 12 stored in the buffer/memory 31-1-2 is transmitted to the SPI/Master 11, on the basis of the number counted by the PTB counter 31-6 and the number counted by the RTC 31-7. That is, the buffer/memory 31-1-2 stores a predetermined number of data blocks from the SPI/Master 11 at timing corresponding to count values of the PTB counter 31-6 and the RTC counter 31-7, and then outputs the stored data blocks from the SPI/Slave 12.

FIG. 8 shows an example in which the S_SerDes 41 and the SPI/Slave 12 are separate devices, but the S_SerDes 41 and the SPI/Slave 12 may be integrated into one device. In this case, the SPI protocol signals are treated as internal signals of the integrated device.

The buffer/memory 31-1-2 in the M_SerDes 31 in FIG. 8 stores a predetermined number of data blocks in one or more predetermined number of frame periods transmitted from the SPI/Master 11, and then outputs the stored data blocks transmitted from the SPI/Slave 12 to be transmitted to SPI/Master 11. The predetermined number of data blocks is, for example, a predetermined number (for example, 4) of continuous data blocks corresponding to total number information (c-5 in FIG. 10 as described later) of data blocks included in the serial signal group transmitted from the SPI/Master 11.

The DLL 31-4 in the M_SerDes 31 in FIG. 8 transmits the data block stored in the buffer/memory 31-1-2 to the S_SerDes 41, in a frame period after a second period elapses after the data block transmitted from the SPI/Master 11 is stored in the buffer/memory 31-1-2. The second period is one TDD frame period L.

The shift register 31-1-1 in the M_SerDes 31 in FIG. 8 sequentially stores a predetermined number of data blocks transmitted from the SPI/Master 11 in the buffer/memory 31-1-2 every first period, and then sequentially reads the data blocks transmitted from the S_SerDes 41 and stored in the buffer/memory 31-1-2, from the buffer/memory 31-1-2 every first period, and transmits the data blocks to the SPI/Master 11. The first period is a length D of the SPI data block.

The shift register 31-1-1 sequentially reads the data blocks from the S_SerDes 41 stored in the buffer/memory 31-1-2 and transmits the data blocks to the SPI/Master 11 without transmitting to the SPI/Master 11 an interrupt signal indicating that the data block from the S_SerDes 41 has arrived.

As described above, in the communication system 2 of FIG. 8, when the M_SerDes 31 receives the SPI data from the SPI/Slave 12, the received data can be transmitted from the M_SerDes 31 to the SPI/Master 11 without transmitting the interrupt signal M_INT to the SPI/Master 11. Therefore, the interrupt signal M_INT is unnecessary, which can simplify the procedure of data transmission and reception between the SPI/Master 11 and the M_SerDes 31.

Figure 9:
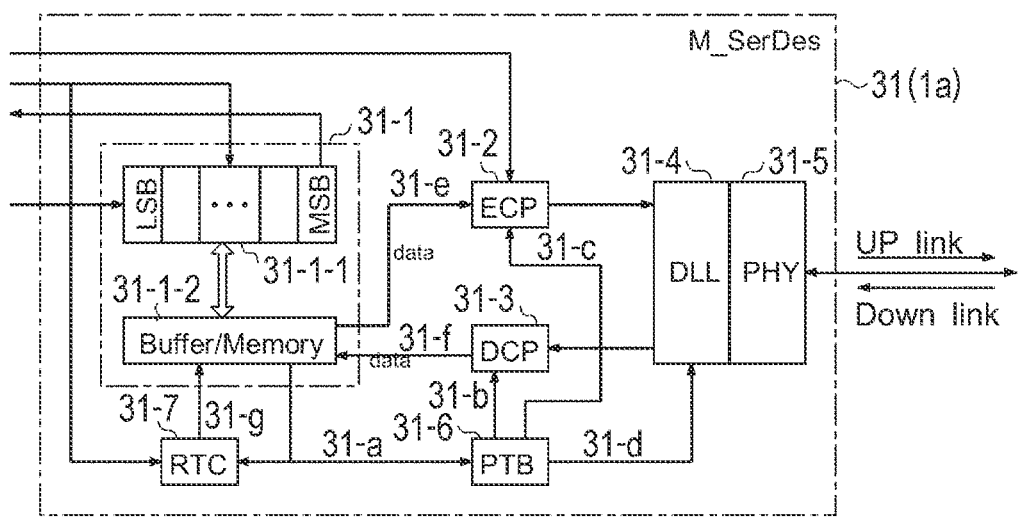
FIG. 9 is a diagram illustrating a signal flow of each unit in M_SerDes in FIG. 8.

FIG. 9 is a diagram illustrating a signal flow of each unit in the M_SerDes 31 in FIG. 8. As illustrated in FIG. 9, the RTC 31-7 performs the counting operation by the SCK supplied from the SPI/Master 11, and a count value of the RTC 31-7 is sent to the buffer/memory 31-1-2. The counting operation of the RTC 31-7 is controlled by data stored in the buffer/memory 31-1-2.

The PTB counter 31-6 measures a TDD cycle L. The accuracy of the PTB counter 31-6 is very high, and for example, the TDD cycle L can be accurately measured by a clock of 250 MHz (hereinafter, the PTB clock). The PTB clock is a clock of a frequency (for example, 250 MHz) defined by the ASA standard.

FIG. 10 is a diagram for describing information included in a transmission packet generated by the ECP 31-2 in the M_SerDes 31 and the ECP 41-2 in the S_SerDes 41. In FIG. 10, an identification symbol, an information name, a function in the transmission packet for performing data transmission from the SPI/Master 11 to the SPI/Slave 12, a function in the transmission packet for performing data transmission from the SPI/Slave 12 to the SPI/Master 11, and a description are associated every piece of information in the transmission packet.

C-1 is a transmission mode, and is instructed by the SPI/Master 11 as a command. The transmission mode included in the packet from the SPI/Slave 12 is used by the SPI/Master 11 to monitor the state. If C-1 is 0, a set of data blocks is transmitted within one frame period of TDD. If C-1 is 1, a plurality of data blocks divided depending on a plurality of frame periods are transmitted.

C-2 is a slave select signal (CSn signal), and is instructed by the SPI/Master 11 as a command. The CSn signal included in the packet from the SPI/Slave 12 is used by the SPI/Master 11 to monitor the state. The CSn signal is a signal for selecting the SPI/Slave 12 that the SPI/Master 11 wants to communicate with. In the CSn signal, not only an individual SPI/Slave 12 can be selected, but also SerDes (M_SerDes 31 or S_SerDes 41) can be selected.

C-3 is an SCK frequency, and is instructed by the SPI/Master 11 as a command. The SCK frequency included in the packet from the SPI/Slave 12 is used by the SPI/Master 11 to monitor the state. In C-3, the SPI/Master 11 designates the SCK frequency on the SPI/Slave 12 side.

C-4 is an SPI mode, and is instructed by the SPI/Master 11 as a command. The SPI mode included in the packet from the SPI/Slave 12 is used by the SPI/Master 11 to monitor the state. For example, if C-4 is 0, mode=0 in FIG. 3A is selected, if it is 1, mode=1 in FIG. 3B is selected, if it is 2, mode=2 in FIG. 3C is selected, and if it is 3, mode=3 in FIG. 3D is selected.

C-5 is a total number of data blocks DB, and is provided as information by the SPI/Master 11. A total number of DB included in the packet from the SPI/Slave 12 is used by the SPI/Master 11 to monitor the state. If C-1 is 0 (at the time of transmission of the divided DB), C-5 is 1. The SPI/Slave 12 returns the number of received DB after the start of SPI communication.

C-6 is a current position of the data block DB, and is provided as information by the SPI/Master 11. It is not included in the packet from the SPI/Slave 12. If C-6 is 0, it indicates that the information is invalid. In a case where C-1 is 0, it is 0. If C-6 is 1, it indicates the head divided data. If it is 2, it indicates the divided data other than the head and final divided data. If it is 3, it indicates the final divided data.

C-7 is a current state of the data block DB, and is provided as information by both the SPI/Master 11 and the SPI/Slave 12. If C-7 is 0, it indicates that the data is dummy data, and if C is 1, it indicates that the data is valid data.

C-8 is the size of the data block DB and is provided as information by the SPI/Master 11. The data transmission size included in the packet from the SPI/Slave 12 is used by the SPI/Master 11 to monitor the state. C-8 represents a data transmission size in bytes, and its maximum size is 511 bytes.

C-9 is interrupt information of the SPI/Slave 12, and is an interrupt flag not included in the packet transmitted by the SPI/Master 11 but included in the packet transmitted by the SPI/Slave 12. If C-9 is 0, it indicates that there is no interrupt, and if C is 1, it indicates that there is an interrupt.

C-10 is an operation state on the SPI/Slave 12 side and is not included in the packet transmitted by the SPI/Master 11 but included in the packet from the SPI/Slave 12. If C-10 is 0, it indicates a normal state, and if C is 1, it indicates busy (DCP31-3 is not empty, and if C is 2, it indicates that an error has occurred (SPI data is corrupted).

C-11 is a reset of the SPI block 41-1, and is instructed by the SPI/Master 11 as a command. It is not included in the packet of the SPI/Slave 12. If C-11 is 0, the reset is not performed, and if it is 1, the SPI block 41-1 of the S_SerDes 41 is reset.

C-12 is the number of the current data block. In a case where a packet is sent from the M_SerDes 31 to the S_SerDes 41, the M_SerDes 31 assigns an ID number to each packet. In a case where a packet is sent from the S_SerDes 41 to the M_SerDes 31, the S_SerDes 41 assigns, to each packet, the same ID number as the ID number of the packet received from the M_SerDes 31.

D-1 represents SPI data transmitted together with the above-described C-1 to C-12, and SPI data transmitted by SPI/Master 11 is output from the M_MOSI pin, and SPI data transmitted by SPI/Slave 12 is output from the S_MISO pin.

E-1 is a CRC transmitted together with C-1 to C-12 and D-1 described above, and is included in both SPI data transmitted from the SPI/Master 11 and the SPI data transmitted from the SPI/Slave 12. The CRC is used for error detection of the control data C-1 to C-12 and the SPI data.

Figure 11:
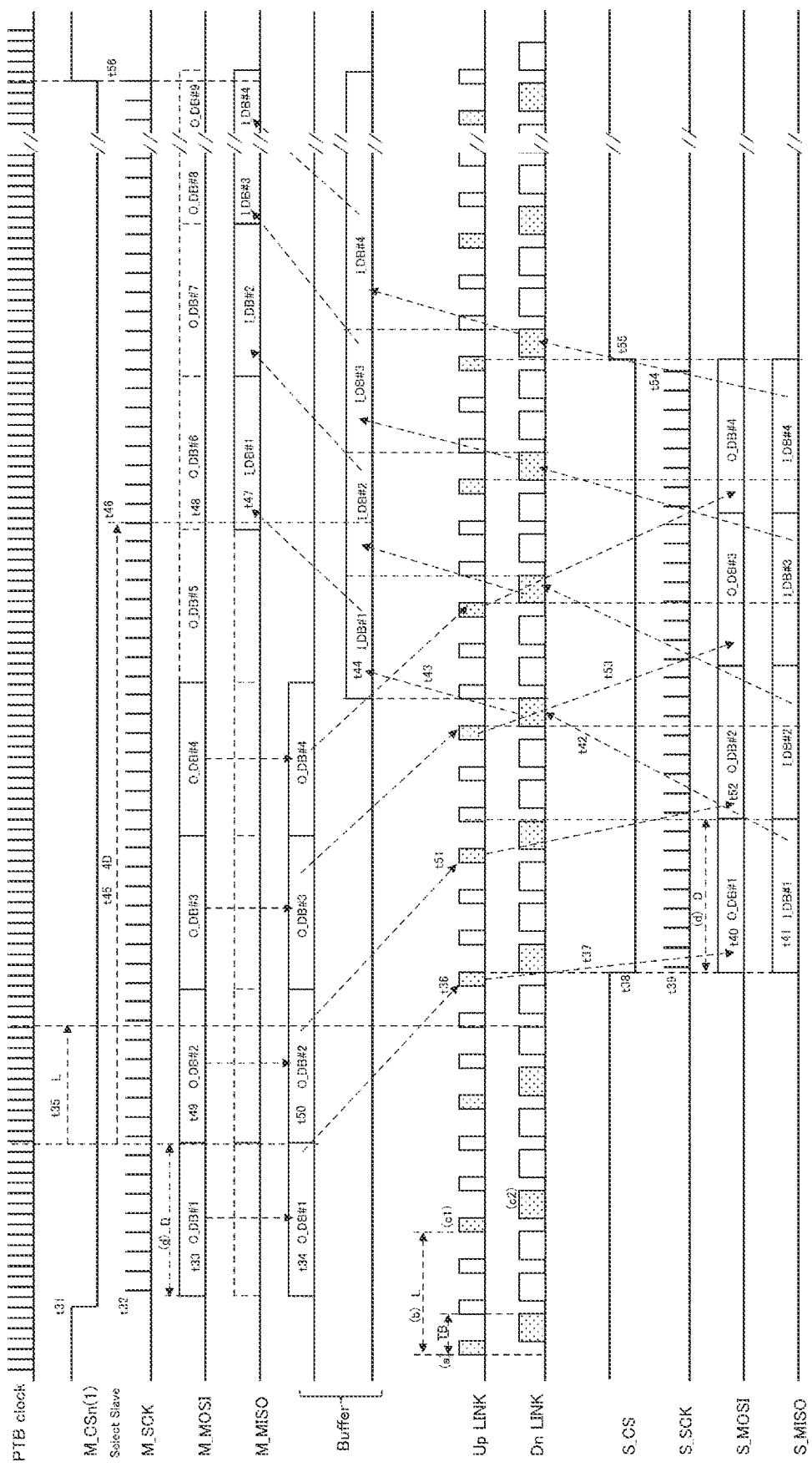
FIG. 11 is a timing chart of a communication system according to the first embodiment.
Figure 12A:
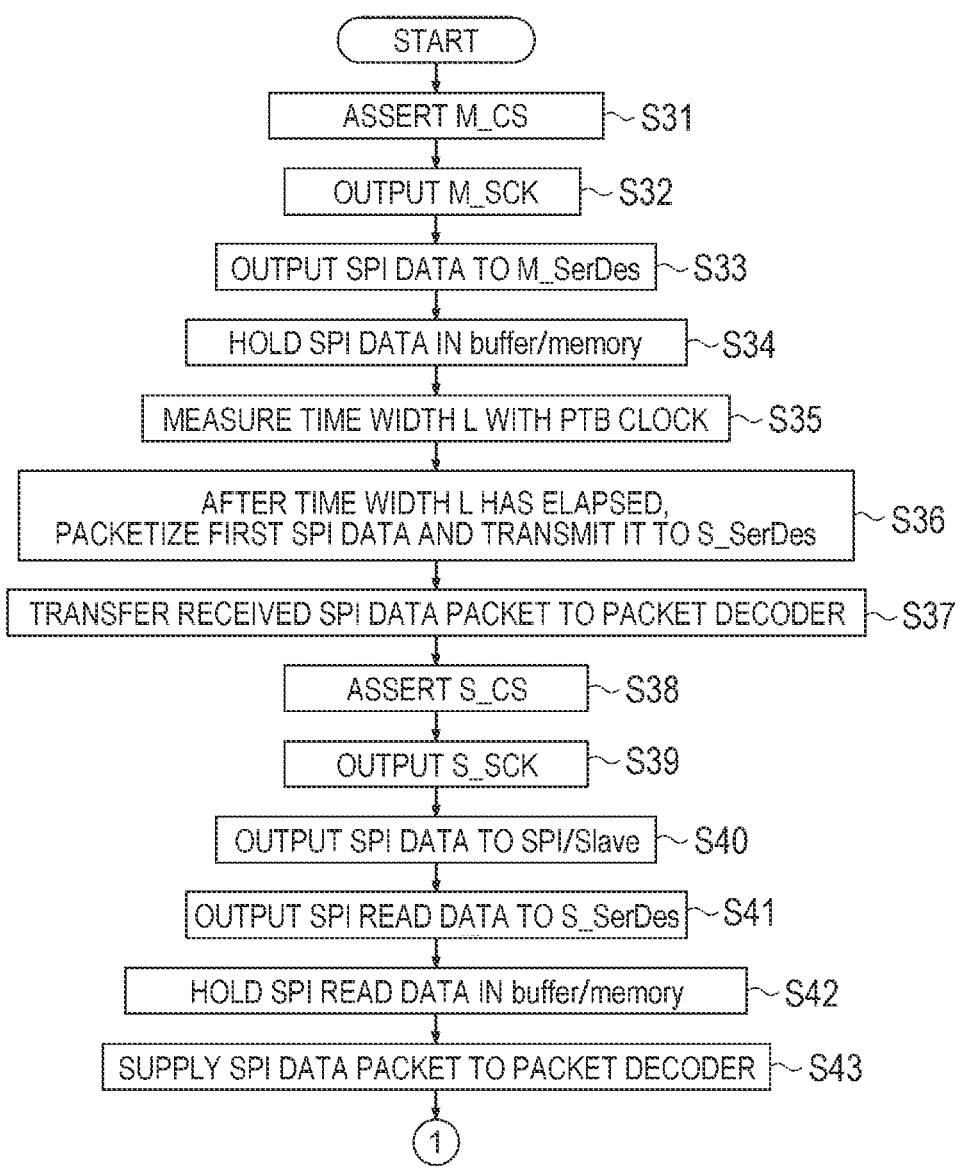
FIG. 12A is a flowchart of a communication system according to the first embodiment.
Figure 12B:
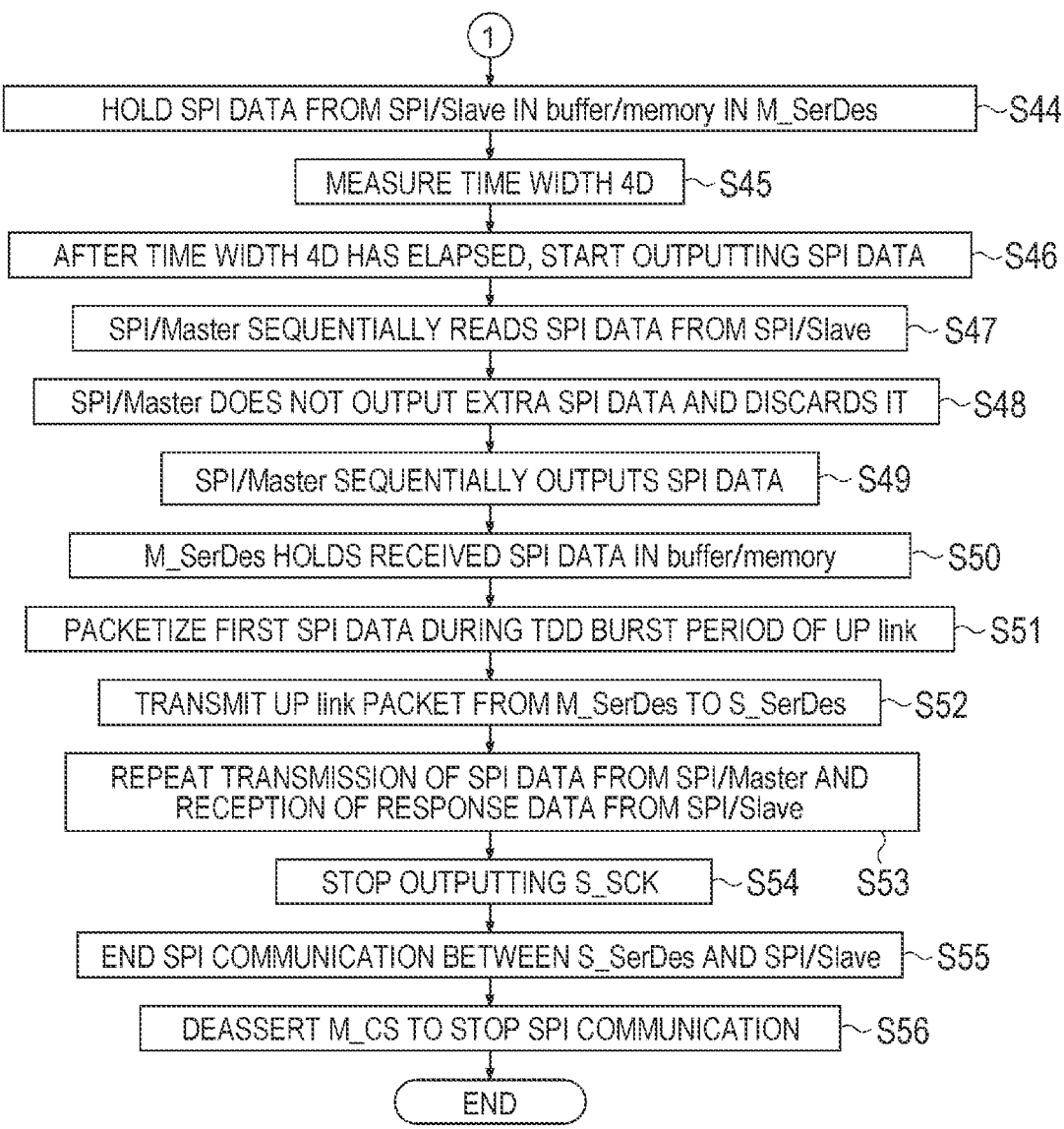
FIG. 12B is a flowchart following FIG. 12A.

FIG. 11 is a timing chart of the communication system 2 according to the first embodiment. FIGS. 12A and 12B are flowcharts of the communication system 2 according to the first embodiment. Hereinafter, a processing operation of the communication system 2 according to the first embodiment will be described on the basis of FIGS. 12A and 12B with reference to FIG. 11.

The SPI/Master 11 asserts CS (M_CS) to start SPI communication (step S31, time t31). Next, the SPI/Master 11 starts clock output of the SCK (M_SCK) of SPI (step S32, time t32).

The SPI/Master 11 outputs to the M_SerDes 31 (step S33, time t33) an N-byte SPI data block (O_DB #1) to be transmitted in synchronization with SCK. In parallel with this, data from M_SerDes 31 is read, but since the SPI/Master 11 recognizes that valid read data from the SPI/Slave 12 is obtained after the fifth SPI data block, SPI data blocks up to fifth are discarded. In this way, the discard of the SPI data block is continued until the fifth SPI data block (O_DB #5).

The M_SerDes 31 temporarily holds the SPI data block (0 DB #1) received from the SPI/Master 11 in the buffer/memory 31-1-2 (step S34, time t34).

The PTB counter 31-6 measures a time width L using the PTB clock from the time point when the buffer/memory 31-1-2 stores the last data in the SPI data block (O_DB #1) (31-*a* in FIG. 9) (step S35, time t35).

After the time width L measured in step S35 has elapsed (31-*c* in FIG. 9), the buffer/memory 31-1-2 outputs the first SPI data block (O_DB #1) to the ECP 31-2 in order to transmit SPI data during the TDD burst period of the UP link allocated to transmit the SPI data block (step S36, time t36, 31-e in FIG. 9). The ECP 31-2 packetizes the SPI data block (O_DB #1) on the basis of the information packetizing the SPI data received from the SPI/Master 11 in advance before performing the process of step S31, and outputs the packetized SPI data block to the DLL 31-4. In this case, a flag (C-7 in FIG. 10 as described later) for indicating that valid SPI data is included is set to valid. The packetized SPI data block (O_DB #1) is output as an UP link packet to the cable 103 via the DLL 31-4 and the PHY 31-5.

The S_SerDes 41 decodes the UP link packet including the received SPI data block (O_DB #1) via the PHY 41-5 and the DLL 41-4, and supplies the SPI data packet to the packet decoder 41-3 (step S37, time t37). The packet decoder 41-3 decodes the SPI data packet and passes the decoded SPI data block (O_DB #1) to the SPI block 41-1.

The controller 41-1-4 in the SPI block 41-1 of the S_SerDes 41 asserts CS (S_CS) indicating that SPI communication for transferring the SPI data block (O_DB #1) to the SPI/Slave 12 is started (step S38, time t38). How long to assert is determined by the SPI transmission mode included in the SPI data packet, the data size (N bytes) of the SPI data block, and the information of the number of SPI data blocks included in one SPI communication.

The SPI block 41-1 of the S_SerDes 41 causes the SPI/Slave 12 to start the clock output of the SCK (S_SCK) of SPI for transferring the SPI data block (0 DB #1) (step S39, time t39). It is reproduced using the SCK frequency information included in the SPI data packet, and has the same frequency as the SCK (M_SCK) on the SPI/Master 11 side.

The SPI block 41-1 of the S_SerDes 41 outputs an N-byte SPI data block (O_DB #1) to the SPI/Slave 12 in synchronization with S_SCK (step S40, time t40). At this time, the SPI mode is determined by SPI mode information included in the SPI data packet.

The SPI/Slave 12 synchronizes SPI read data (I_DB #1) with SCK (S_SCK) at the same time, and outputs the same N bytes as the write data (0 DB #1) from the SPI/Master 11 (step S41, time t41).

The S_SerDes 41 temporarily holds the received N-byte SPI read data (I_DB #1) in the buffer/memory 41-1-2 (step S42, time t42). The buffer/memory 41-1-2 holds the N-byte SPI data block (I_DB #1) and then generates the Down link packet (I_DB #1) including the encapsulated SPI data via the packet encoder 41-2 that performs an encapsulation processing for transmitting SPI data during the TDD burst period of the Down link allocated for transmitting the first SPI data scheduled by the DLL (DLL 41-4 in FIG. 8). The S_SerDes 41 transmits the Down link packet to the M_SerDes 31 through the cable 103.

The M_SerDes 31 decodes the Down link packet including the received SPI data block (I_DB #1) via the PHY 31-5 and the DLL 31-4, and supplies the decoded SPI data packet to the packet decoder 31-3. The packet decoder 31-3 decodes the SPI data packet and passes the decoded SPI data block (I_DB #1) to the SPI block 31-1 (step S43, time t43, 31-f in FIG. 9).

The buffer/memory 31-1-2 in the SPI block 31-1 temporarily holds the SPI data block (I_DB #1) (step S44, time t44).

The RTC 31-7 (RTC 31-7 in FIG. 8) measures a time width 4D using the SCK clock from the time point when the buffer/memory 31-1-2 records the last data in the SPI data block (O_DB #1) (31-*a* in FIG. 9) (step S45, time t45).

The buffer/memory 31-1-2 starts outputting an N-byte SPI data block (O_DB #1) in synchronization with the SCK, starting from the next SCK clock whose time width 4D is measured by the RTC 31-7 using the SCK clock, that is, an output start time point 31-*g* of the SPI write data (O_DB #6) output by the SPI/Master 11 (step S46, time t46).

The SPI/Master 11 sequentially reads the SPI data block (I_DB #1) from the SPI/Slave 12 by N bytes in synchronization with the SCK (step S47, time t47).

The SPI/Master 11 outputs the write data (O_DB #6) at the same time, but since the M_SerDes 31 recognizes the number of SPI data blocks (4 in this example) to be transmitted in this SPI communication in the processing performed before step S31, these SPI data blocks are discarded without performing the processing for outputting the SPI data blocks after the write data (O_DB #5) (step S48, time t48).

In the processing so far, the SPI/Master 11 completes the writing of the first SPI data block (O_DB #1) into the SPI/Slave 12 and the corresponding reading of the SPI data block (I_DB #1) from the SPI/Slave 12 without using an interrupt signal.

Following the first SPI data block (O_DB #1), the SPI/Master 11 outputs the next SPI data block (O_DB #2), and sequentially outputs the SPI data blocks to be transmitted (step S49, time t49).

However, the SPI data blocks transmitted to the SPI/Slave 12 are up to (0 DB #4), and thereafter are dummy data accompanying processing of reading the SPI data blocks from the SPI/Slave 12.

The M_SerDes 31 temporarily holds the received SPI data block (O_DB #2) in the buffer/memory 31-1-2 (step S50, time t50).

After holding the SPI data block (0 DB #2), the buffer/memory 31-1-2 outputs the SPI data block (O_DB #2) to the ECP 31-2 to transmit SPI data during the TDD burst period of the UP link allocated to transmit the SPI data that arrives first (step S51, time t51).

Here, a waiting time L as in step S35 is not necessary. The ECP 31-2 packetizes the SPI data block (O_DB #2) on the basis of the information packetizing the SPI data received in advance before the processing of step S31, and outputs the packetized SPI data block to the DLL 31-4. The packetized SPI data block (O_DB #2) is output as an UP link packet to the cable 103 via the DLL 31-4 and the PHY 31-5 (step S52, time t52). The same processing is sequentially performed for the remaining SPI write data blocks (O_DB #3, #4).

The processing from step S40 to step S52 are sequentially performed on the SPI data blocks (O_DB #2, #3, and #4) and (I_DB #2, #3, #4) (step S53, time t53).

After receiving the SPI data for the blocks described in the SPI data packet (four blocks in this example), the controller 41-1-4 in the SPI block 41-1 of the S_SerDes 41 stops the clock output of S_SCK to indicate to the SPI/Slave 12 that the SPI communication is ended (step S54, time t54).

Moreover, the S_SerDes 41 ends the SPI communication between the S_SerDes 41 and the SPI/Slave 12 by deasserting S_CS (step S55, time t55).

The SPI/Master 11 performs the clock output of SCK up to the number of five SPI data blocks (4+5=9 in this example), which is a processing delay time regardless of the phase relationship between the SPI communication start timing and the TDD burst, added to the number of SPI data blocks (4 in this example) read from the SPI/Slave 12, and continues the read processing up to the SPI data block (I_DB #4), and after the end of the read, deasserts M_CS to end the SPI communication (step S56, time t56).

By the above processing operation, the SPI communication between the SPI/Master 11 and the SPI/Slave 12 via the M_SerDes 31 and the S_SerDes 41 can be performed without using an interrupt signal.

Figure 13:
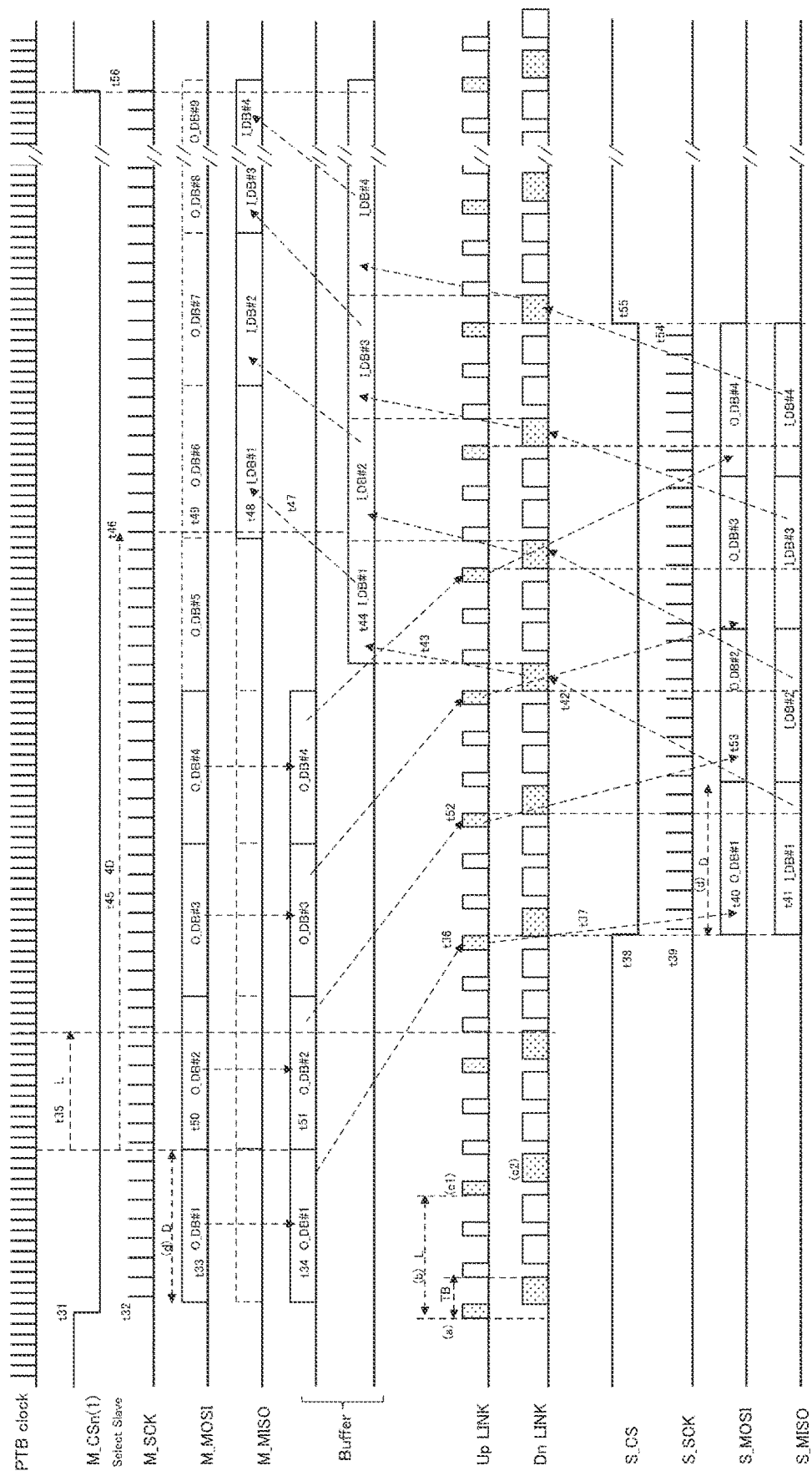
FIG. 13 is a timing chart of a modification example of FIG. 11.

FIG. 13 is a timing chart according to a modification example of FIG. 11. FIG. 13 illustrates an example in which the relationship between the SPI communication start timing and the timing of the TDD burst signal is different from that in FIG. 11.

Similarly to FIG. 11, when the SPI data block (O_DB #1) at the start of SPI communication is transferred to the UP link of the TDD burst signal in step S35, the time width L is counted from the time when the SPI data block (O_DB #1) is held in the buffer/memory 31-1-2 by the PTB counter 31-6, the SPI data is transferred in the UP link packet in the TDD burst period allocated to the subsequent SPI data, the SCK clock is measured from the same starting point, and the first read data from the SPI/Slave 12 is read after counting the time 4D, so that the SPI/Master 11 can correctly read the SPI data without using an interrupt signal. The numbers and the descriptions thereof in FIG. 13 are the same as those in FIG. 11, and thus the description thereof will be omitted.

As described above, in the first embodiment, after the SPI/Master 11 transmits four SPI data blocks to the M_SerDes 31, the M_SerDes 31 receives a packet including response data from the SPI/Slave 12 transmitted from the S_SerDes 41, and transmits the corresponding SPI data block to the SPI/Master 11. Therefore, the SPI/Master 11 can learn in advance when the response data from the SPI/Slave 12 arrives even if there is no interrupt signal from the M_SerDes 31, and can correctly receive the response data. Therefore, it is not necessary to transmit and receive an interrupt signal between the SPI/Master 11 and the M_SerDes 31, and a pin for the interrupt signal is unnecessary, which allows the cost to be reduced.

Second Embodiment

In the first embodiment, when the SPI data block (O_DB #1) at the start of the SPI communication is transferred in the UP link packet during the TDD burst period, the time width L is counted by the PTB counter 31-6 starting from when the SPI data block (O_DB #1) is held in the buffer/memory 31-1-2, and after the time width L has elapsed, the subsequent SPI data is sequentially transferred in the UP link packet. Furthermore, the SCK clock is measured by the RTC 31-7 from the same starting point to count the time 4D, and then the first read data from the SPI/Slave 12 is read. Therefore, the SPI/Master 11 can correctly read the SPI data without using an interrupt signal, but on the other hand, the processing delay time L is generated until the data is transmitted from the M_SerDes 31 to the S_SerDes 41, so that the arrival of the SPI data from the SPI/Master 11 to the SPI/Slave 12 is delayed.

A communication system 2 according to the second embodiment described below is characterized in that, after the M_SerDes 31 receives the SPI data block from the SPI/Master 11, the SPI data block is packetized and transmitted to the S_SerDes 41 without waiting until the processing delay time L elapses.

The communication system 2 according to the second embodiment has a block configuration similar to that in FIG. 8. The DLL 31-4 in the M_SerDes 31 according to the second embodiment transmits the data block stored in the buffer/memory 31-1-2 to the S_SerDes 41, in a frame period before a second period elapses after the data block transmitted from the SPI/Master 11 is stored in the buffer/memory 31-1-2. In a case where the data block to be transmitted to the S_SerDes 41 is not ready, the DLL 31-3 stops transmitting the data block to the S_SerDes 41 until the next frame period. In a case where the data block from the S_SerDes 41 does not arrive for the data block from SPI/Master 11, the buffer/memory 31-1-2 stops storing a new data block until the next frame period.

Figure 14:
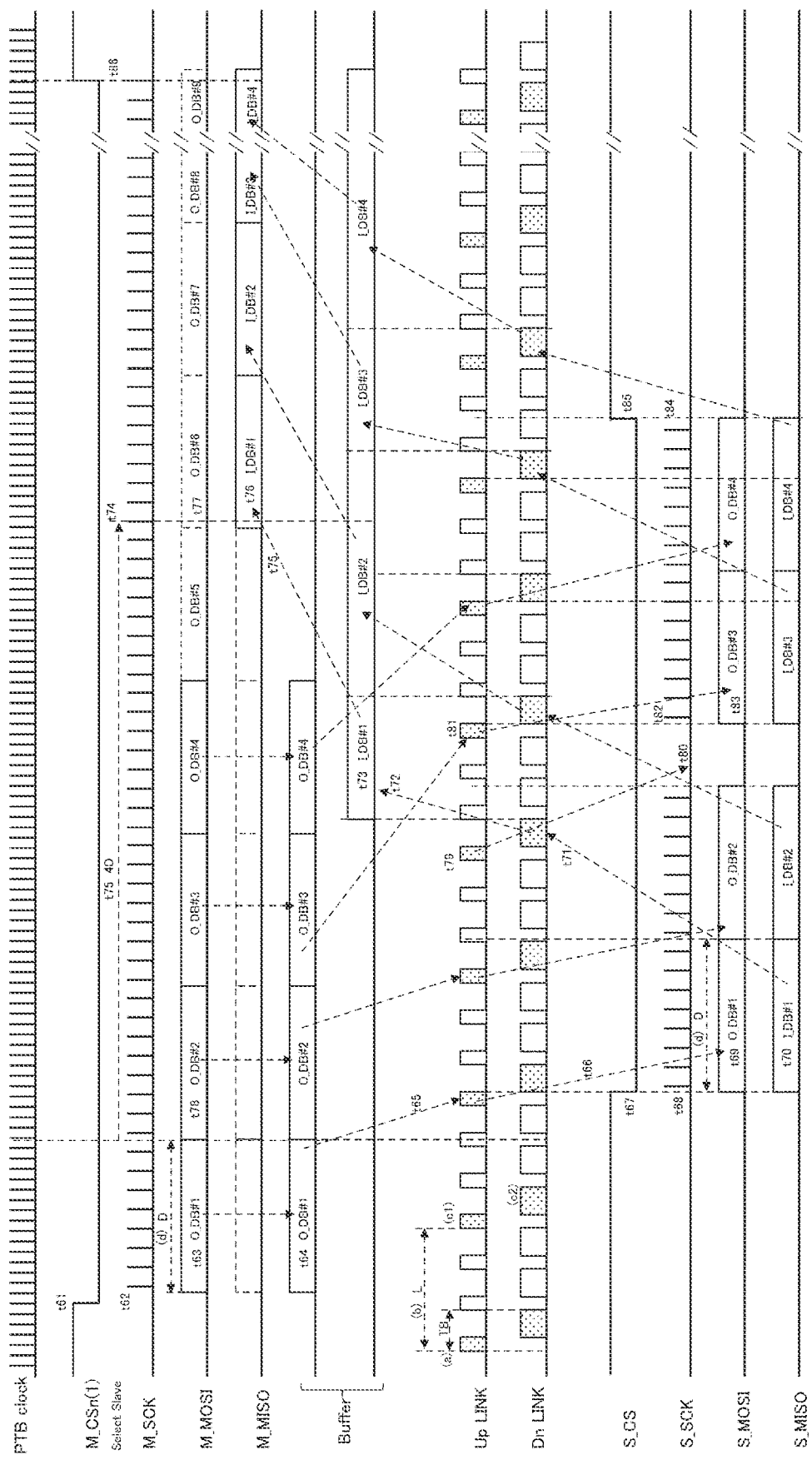
FIG. 14 is a timing chart of a communication system according to a second embodiment.
Figure 15A:
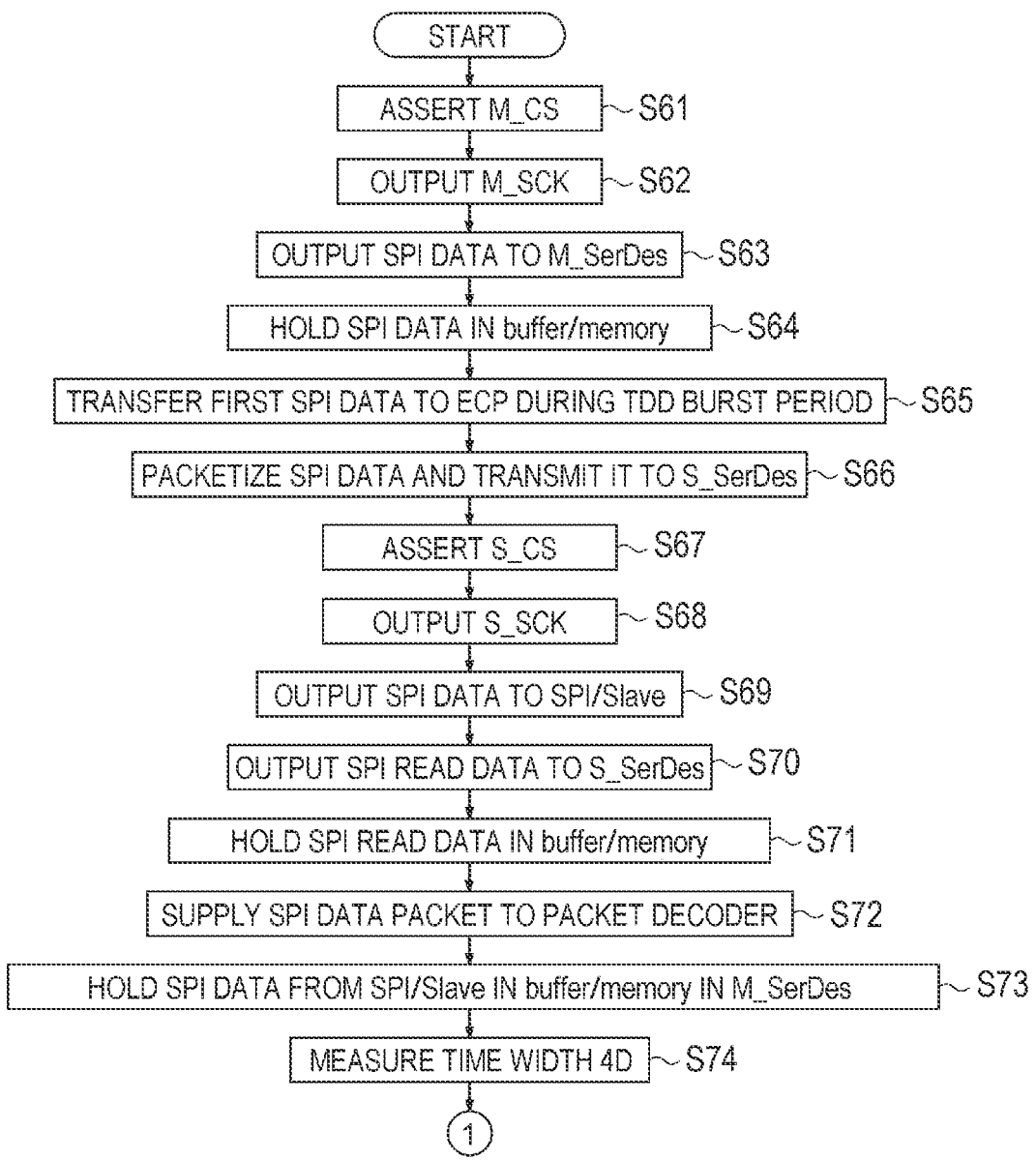
FIG. 15A is a flowchart illustrating a processing operation of a communication system according to the second embodiment.
Figure 15B:
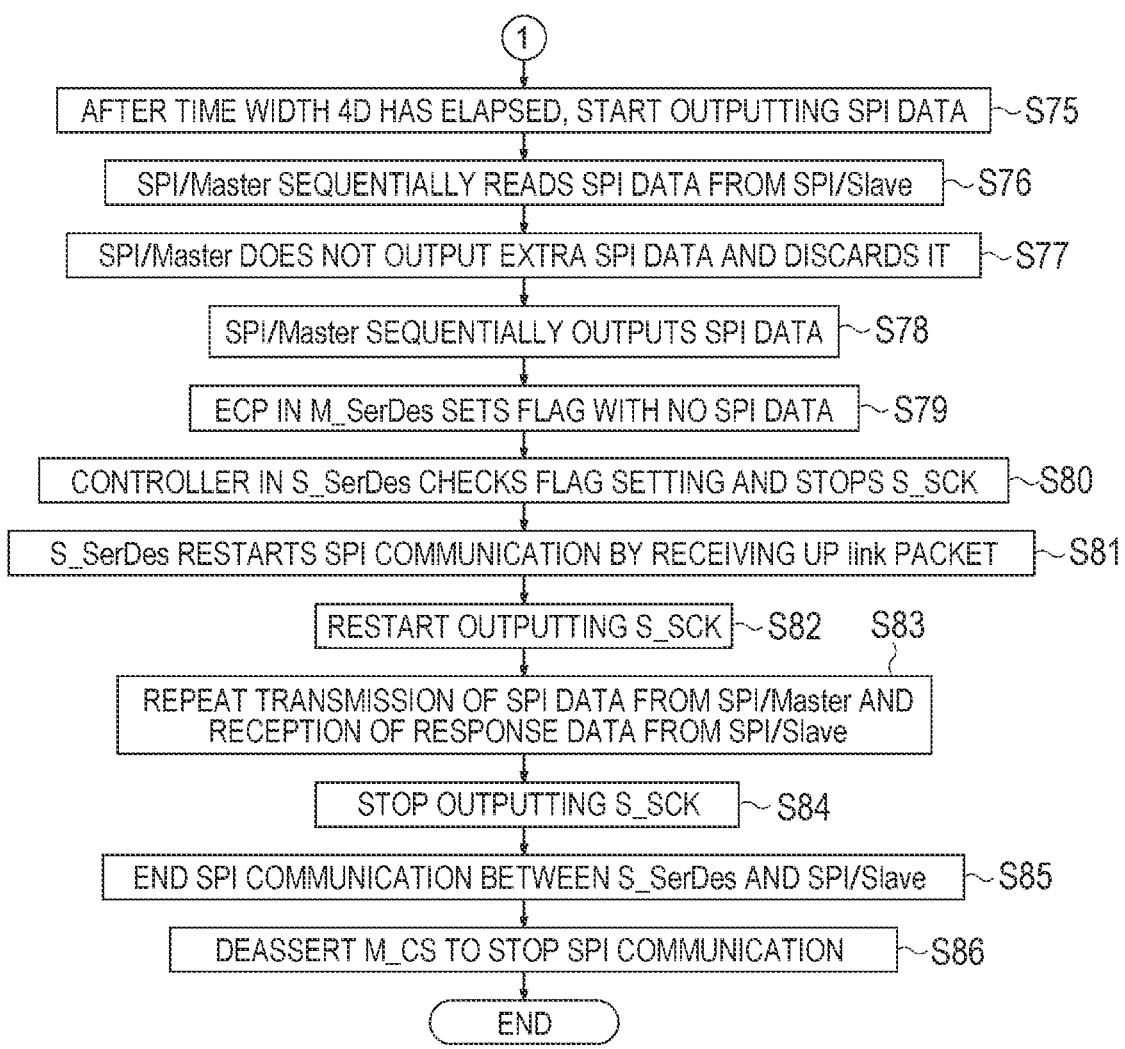
FIG. 15B is a flowchart following FIG. 15A.

FIG. 14 is a timing chart of the communication system 2 according to the second embodiment. FIGS. 15A and 15B are flowcharts illustrating processing operation of the communication system 2 according to the second embodiment. Hereinafter, the processing operation of the communication system 2 according to the second embodiment will be described on the basis of FIGS. 15A and 15B with reference to FIG. 14.

The SPI/Master 11 asserts CS (M_CS) to start SPI communication. (step S61, time t61). The SPI/Master 11 starts the clock output of the SCK of SPI (step S62, time t62).

The SPI/Master 11 outputs to the M_SerDes 31 an N-byte SPI data block (O_DB #1) to be transmitted in synchronization with SCK (step S63, time t63). At the same time, data is read from the M_SerDes 31. Since the SPI/Master 11 recognizes that valid read data from the SPI/Slave 12 is obtained after transmitting five SPI data blocks, the read data from the M_SerDes 31 is discarded. The discard of the read data is continuously performed for a period until the fifth SPI data block (O_DB #5) is transmitted.

The M_SerDes 31 temporarily holds the received SPI data block (O_DB #1) in the buffer/memory 31-1-2 (step S64, time t64).

After holding the last data in the SPI data block (O_DB #1), the buffer/memory 31-1-2 outputs the SPI data block (O_DB #1) to the ECP 31-2 to transmit the SPI data block (O_DB #1) during the first incoming TDD burst period of the UP link allocated to transmit the SPI data (step S65, time t65, 31-e in FIG. 9).

The ECP 31-2 packetizes the SPI data block (O_DB #1) in a format based on FIG. 10 according to the information packetizing the SPI data received in advance before the processing of step S61, and outputs the packetized SPI data block to the DLL 31-4. In this case, a flag (C-7 in FIG. 10) for indicating that valid SPI data is included is set to valid.

The packetized SPI data block (O_DB #1) is output as an UP link packet to the cable 103 via the DLL 31-4 and the PHY 31-5.

The S_SerDes 41 decodes the UP link packet including the received SPI data block (O_DB #1) via the PHY 41-5 and the DLL 41-4, and supplies the SPI data packet to the packet decoder 41-3 (step S66, time t66). The packet decoder 41-3 decodes the SPI data packet and passes the decoded SPI data block (0 DB #1) to the SPI block 41-1.

The controller 41-1-4 in the SPI block 41-1 of the S_SerDes 41 asserts CS (S_CS) indicating that SPI communication for transferring the SPI data block (O_DB #1) to the SPI/Slave 12 is started (step S67, time t67). How long to assert is determined by the SPI transmission mode included in the SPI data packet, the data size (N bytes) of the SPI data block, and the information of the number of SPI data blocks used in one SPI communication.

The SPI block 41-1 of the S_SerDes 41 causes the SPI/Slave 12 to start the clock output of the SCK (S_SCK) of SPI for transferring the SPI data block (O_DB #1) (step S68, time t68). It is reproduced using the SCK frequency information included in the SPI data packet, and has the same frequency as the SCK (M_SCK) on the SPI/Master 11 side.

The SPI block 41-1 of the S_SerDes 41 outputs an N-byte SPI data block (O_DB #1) to the SPI/Slave 12 in synchronization with S_SCK (step S69, time t69). At this time, the SPI mode is determined by SPI mode information included in the SPI data packet.

The SPI/Slave 12 synchronizes SPI read data (I_DB #1) with SCK (S_SCK) at the same time, and outputs the same N bytes as the write data (0 DB #1) (step S70, time t70).

The S_SerDes 41 temporarily holds the received N-byte SPI read data (I_DB #1) in the buffer/memory 41-1-2 (step S71, time t71). The buffer/memory 41-1-2 holds the N-byte SPI data block (I_DB #1) and then transfers the encapsulated SPI data packet (I_DB #1) via the packet encoder 41-2 that performs an encapsulation process for transmitting SPI data during the TDD burst period of a first incoming Down link allocated for transmitting the SPI data scheduled by the DLL (DLL 41-4 in FIG. 8). The S_SerDes 41 transmits the Down link packet to the M_SerDes 31 through the cable 103.

The M_SerDes 31 decodes the Down link packet including the received SPI data block (I_DB #1) via the PHY 31-5 and the DLL 31-4, and supplies the SPI data packet to the packet decoder 31-3 (step S72, time t72). The packet decoder 31-3 decodes the SPI data packet and passes the decoded SPI data block (I_DB #1) to the SPI block 31-1 (31-f in FIG. 9).

The buffer/memory 31-1-2 in the SPI block 31-1 temporarily holds the SPI data block (I_DB #1) (step S73, time t73).

The RTC 31-7 measures a time width 4D using the SCK clock from the time point when the buffer/memory 31-1-2 records the last data of the SPI data block (O_DB #1) (31-a in FIG. 9) (step S74, time t74).

The buffer/memory 31-1-2 starts outputting an N-byte SPI data block (O_DB #1) in synchronization with the SCK, starting from the next SCK clock whose time width 4D is measured by the RTC 31-7 using the SCK clock, that is, the output start time point (31-g) of the SPI write data (O_DB #6) output by the SPI/Master 11 (step S75, time t75).

The SPI/Master 11 sequentially reads the SPI data block (I_DB #1) from the SPI/Slave 12 by N bytes in synchronization with the SCK (step S76, time t76).

The SPI/Master 11 simultaneously outputs write data (O_DB #6). Since the M_SerDes 31 recognizes the number of SPI data blocks (4 in this example) to be transmitted in this SPI communication in the processing procedure performed before step S61, those SPI data blocks are discarded without performing the processing for outputting the SPI data blocks after the write data (O_DB #5) (step S77, time t77).

In the processing procedure so far, the SPI/Master 11 completes the writing of the first SPI data block (O_DB #1) into the SPI/Slave 12 and the reading of the SPI data block (I_DB #1) from the SPI/Slave 12 without using an interrupt signal.

Following the first SPI data block (O_DB #1), the SPI/Master 11 outputs the next SPI data block (O_DB #2), and sequentially outputs the SPI data blocks to be transmitted (step S78, time t78). However, the SPI data blocks transmitted to the SPI/Slave 12 are up to (O_DB #4), and thereafter are dummy data accompanying processing for reading the read data blocks from the SPI/Slave 12. Thereafter, the same processing as in steps S63 to S78 is performed on each SPI data block (O_DB #2,3,4). In the second embodiment, the first SPI data block (O_DB #1) transmitted from the SPI/Master 11 is transmitted without causing the processing delay time L in the M_SerDes 31, so that the following different processes are required.

The buffer/memory 31-1-2 temporarily holds the SPI data block (I_DB #X) sequentially input from the SPI/Master 11, and outputs the SPI data block (I_DB #X) to the UP link allocated to transmit the SPI data via the ECP 31-2, but since the SPI data (O_DB #3 in this case) is not completely accumulated in the buffer/memory 31-1-2 at the timing of the TDD burst period for the UP link, the ECP 31-2 invalidates a flag (C-7 in FIG. 10) indicating that the SPI data is not included to be output to the DLL 31-4 (step S79, time t79). The DLL 31-4 and the PHY 31-5 output an SPI packet not including SPI data to the cable 103 as an UP link packet.

When the S_SerDes 41 analyzes the received SPI packet of the UP link with the DCP 41-3 and detects an empty flag (C-7 Invalid in FIG. 10) to find that SPI data is not included, it sends this information to the controller 41-1-4 in the SPI block 41-1, and the controller 41-1-4 stops the operation of the SCK generator 41-1-3 and stops the output of the SCK clock (step S80, time t80). Therefore, SPI communication between the S_SerDes 41 and the SPI/Slave 12 is temporarily stopped.

When receiving the UP link packet including the SPI data block (O_DB #3), the S_SerDes 41 recognizes that the SPI data is included through analysis by the DCP 41-3, restarts the SPI communication, and sends this information to the controller 41-1-4 in the SPI block 41-1 (step S81, time t81).

The controller 41-1-4 restarts the operation of the SCK generator 41-1-3 and starts the clock output of SCK (step S82, time t82).

The processing of steps S69 to S78 is sequentially performed for each of the SPI data blocks (O_DB #3, #4) and (I_DB #3, #4) (step S83, time t83).

After receiving the SPI data for the number of blocks described in the SPI data packet (four blocks in this example), the controller 41-1-4 in the SPI block 41-1 of the S_SerDes 41 stops the clock output of S_SCK to inform the SPI/Slave 12 of the end of the SPI communication (step S84, time t84).

Furthermore, deasserting S_CS ends the SPI communication between the S_SerDes 41 and the SPI/Slave 12 (step S85, time t85).

The SPI/Master 11 performs the clock output of SCK up to the number of five SPI data blocks (4+5=9 in this example), which is a processing delay time regardless of the phase relationship between the SPI communication start timing and the TDD burst period, added to the number of SPI data blocks (4 in this example) read from the SPI/Slave 12, and continues the read processing up to the SPI data block (I_DB #4), and after the end of the read, deasserts M_CS to end the SPI communication (step S86, time t86).

As described above, the M_SerDes 31 that has received the SPI data block from the SPI/Master 11 transmits to the S_SerDes 41 the UP link packet including the received SPI data block, before the frame period L of TDD elapses. Therefore, the SPI data block from the SPI/Master 11 can be quickly transmitted to the SPI/Slave 12. Since the S_SerDes 41 does not supply a clock to the shift register in a case where the UP link packet from the M_SerDes 31 does not arrive, the shift register can be operated depending on the timing when the UP link packet arrives from the M_SerDes 31, which allows power consumption to be reduced.

Note that the present technology can have the following configurations.

(1) A communication device including:
 a communication unit that adds identification information for identifying a data block to a set of data blocks having a serial signal group conforming to a serial peripheral interface (SPI) transmitted from a master in synchronization with a clock, and transmits the data block to a communication partner device within one frame period of a predetermined communication protocol, or adds identification information for identifying each of a plurality of data blocks to the plurality of data blocks having each part of the serial signal group, and transmits the data block to the communication partner device in a plurality of frame periods; and
 a storage unit that sequentially stores one or more predetermined number of data blocks transmitted from the master, and then outputs a data block transmitted from a slave via the communication partner device in response to the predetermined number of data blocks from the master and stored therein, to transmit the data block to the master.

(2) The communication device according to (1), in which the predetermined number of data blocks are transmitted to the communication partner device in the predetermined number of frame periods.

(3) The communication device according to (1) or (2), in which the predetermined number of data blocks are a predetermined number of consecutive data blocks corresponding to total number information of the data blocks included in the serial signal group transmitted from the master.

(4) The communication device according to any one of (1) to (3), further including:
 a first counter that measures a length of the frame period on the basis of a reference clock shared between the master and the slave; and
 a second counter that counts the number of data blocks transmitted from the master,
 in which the storage unit sequentially stores the predetermined number of data blocks at timing corresponding to count values of the first counter and the second counter, and then outputs the stored data block from the communication partner device.

(5) The communication device according to (4),
 in which the reference clock is a clock of a frequency defined by an Automotive SerDes Alliance (ASA) standard, and
 the second counter may perform a counting operation in synchronization with a clock included in a serial signal group conforming to the SPI.

(6) The communication device according to any one of (1) to (5), in which a first period that is a period in which the predetermined number of data blocks transmitted from the master are stored in the storage unit is equal to or longer than a second period that is a period in which the communication unit transmits a packet including the data block to the communication partner device.

(7) The communication device according to (6), in which the second period is longer than a half period of the first period.

(8) The communication device according to (6) or (7), in which the communication unit transmits the data block stored in the storage unit to the communication partner device in the frame period after the second period elapses after the data block transmitted from the master is stored in the storage unit.

(9) The communication device according to (6) or (7), in which the communication unit transmits the data block stored in the storage unit to the communication partner device in the frame period before the second period elapses after the data block transmitted from the master is stored in the storage unit.

(10) The communication device according to (9), in which, in a case where the data block to be transmitted to the communication partner device is not ready, the communication unit stops transmitting the data block to the communication partner device until a next frame period.

(11) The communication device according to (10), in which, in a case where the data block from the communication partner device does not arrive at the data block from the master, the storage unit stops storing a new data block until a next frame period.

(12) The communication device according to any one of (6) to (11), further including a shift register that sequentially stores the predetermined number of data blocks transmitted from the master in the storage unit every first period, and then sequentially reads the data blocks transmitted from the communication partner device and stored in the storage unit every first period from the storage unit and transmits the data blocks to the master.

(13) The communication device according to (12), in which the shift register sequentially reads data blocks from the communication partner device stored in the storage unit and transmits the data blocks to the master, without transmitting an interrupt signal indicating that a data block from the communication partner device has arrived to the master.

(14) The communication device according to any one of (1) to (13), in which the communication unit transmits a data block from the master to the communication partner device and receives a data block from the communication partner device in different periods within the frame period using the communication protocol according to time division duplex (TDD) with the communication partner device.

(15) A communication system including a first communication device and a second communication device that transmit and receive packets with a predetermined communication protocol,
 in which the first communication device includes:
 a first communication unit that adds identification information for identifying a data block to a set of data blocks having a serial signal group conforming to a serial peripheral interface (SPI) transmitted from a master in synchronization with a clock, and transmits the data block to the second communication device within one frame period of a predetermined communication protocol, or adds identification information for identifying each of a plurality of data blocks to the plurality of data blocks having each part of the serial signal group, and transmits the data block to the second communication device in a plurality of frame periods; and a first storage unit that sequentially stores one or more predetermined number of data blocks transmitted from the master, and then stores data blocks transmitted from a slave via the second communication device in response to the predetermined number of data blocks from the master, and the second communication device includes a second communication unit that transmits a data block transmitted from the slave in response to the predetermined number of data blocks transmitted from the first communication unit to the first communication device within at least one of the frame periods.

(16) The communication system according to (15), in which the first communication device further includes a first shift register that sequentially stores the predetermined number of data blocks transmitted from the master in the first storage unit and then sequentially reads the data blocks transmitted from the second communication device and stored in the first storage unit from the first storage unit and transmits the data blocks to the master, and the second communication device further includes:

a second storage unit that stores the predetermined number of data blocks transmitted from the first communication unit and also stores the data blocks transmitted from the slave; and a second shift register that sequentially stores the predetermined number of data blocks transmitted from the first communication unit in the second storage unit, sequentially reads the data blocks transmitted from the slave and stored in the second storage unit from the second storage unit, and transmits the data blocks to the first communication unit via the second communication unit.

(17) The communication system according to (16), in which the second shift register stops a shift operation in a case where there is no data block to be stored in the second storage unit or no data block to be transmitted to the first communication unit.

(18) The communication system according to (17), further including a clock generator that generates a clock that causes the second shift register to perform a shift operation in a case where the second communication unit receives a data block to be stored in the second storage unit.

(19) The communication system according to (18), in which the clock is synchronized with a serial clock included in a serial signal group conforming to the SPI transmitted from the master to the first communication device.

(20) A communication method including:

a step of adding identification information for identifying a data block to a set of data blocks having a serial signal group conforming to a serial peripheral interface (SPI) transmitted from a master in synchronization with a clock, and transmitting the data block to a communication partner device within one frame period of a predetermined communication protocol, or adding identification information for identifying each of a plurality of data blocks to the plurality of data blocks having each part of the serial signal group and transmitting the data block to the communication partner device in a plurality of frame periods; and a step of sequentially storing in a storage unit one or more predetermined number of data blocks transmitted from the master, and then reading a data block transmitted from a slave via the communication partner device in response to the predetermined number of data blocks from the master and stored in the storage unit, to transmit the data block to the master.

Aspects of the present disclosure are not limited to the above-described individual embodiments, but include various modifications that can be conceived by those skilled in the art, and the effects of the present disclosure are not limited to the above-described contents. That is, various additions, modifications, and partial deletions can be made without departing from the conceptual idea and spirit of the present disclosure derived from the contents defined in the claims and equivalents thereof.

REFERENCE SIGNS LIST

1a Communication device
1b Communication device
2 Communication system
11 SPI/Master
11-1 Shift register
11-2 Buffer/memory
11-3 Controller
11-4 SCK generator
12-1 Shift register
12-2 Buffer/memory
31 M_SerDes
31-1 SPI block
31-1-1 Shift register
31-1-2 Buffer/memory
31-2 Packet encoder
31-3 Packet decoder
31-5 PHY
31-6 PTB counter
31-7 RTC counter
32 Peripheral device
41 S_SerDes
41-1 SPI block
41-1-1 Shift register
41-1-2 Buffer/memory
41-1-3 SCK generator
41-1-4 Controller
41-2 Packet encoder
41-3 Packet decoder
41-5 PHY
103 Cable

The invention claimed is:
1. A communication device comprising:
communication circuitry that includes identification information in a packet that includes data blocks having a serial signal group conforming to a serial peripheral interface (SPI), the data blocks transmitted from a master in synchronization with a reference clock, the identification information identifying the data blocks, and that transmits the data blocks to a communication partner device within one frame period of a predetermined communication protocol, or that transmits the data blocks to the communication partner device in a plurality of frame periods; and a memory that sequentially stores a predetermined number of the data blocks transmitted from the master, and then outputs an other data block transmitted from a slave via the communication partner device in response to storing the predetermined number of the data blocks from the master, to transmit the other data block to the master, wherein the communication circuitry further includes a transmission mode information and an SPI mode information in the packet, the transmission mode information indicates whether all of a plurality of frames corresponding to the data blocks are to be transmitted in a time division duplex (TDD) burst or fewer than all of the plurality of frames corresponding to the data blocks are to be transmitted in the TDD burst, and the SPI mode information indicates a transmission processing type that is based upon a clock polarity setting and a clock phase setting corresponding to the reference clock.

2. A communication device comprising:

communication circuitry that includes identification information in a packet that includes data blocks having a serial signal group conforming to a serial peripheral interface (SPI), the data blocks transmitted from a master in synchronization with a reference clock, the identification information identifying the data blocks, and that transmits the data blocks to a communication partner device within one frame period of a predetermined communication protocol, or that transmits the data blocks to the communication partner device in a plurality of frame periods;

a memory that sequentially stores a predetermined number of the data blocks transmitted from the master, and then outputs an other data block transmitted from a slave via the communication partner device in response to storing the predetermined number of the data blocks from the master, to transmit the other data block to the master;

a first counter that measures a length of a frame period on a basis of the reference clock; and a second counter that counts the number of the data blocks transmitted from the master, wherein the memory sequentially stores the predetermined number of the data blocks at timing corresponding to count values of the first counter and the second counter, and then outputs the other data block.

3. The communication device according to claim 2, wherein the reference clock is a clock of a frequency defined by an Automotive SerDes Alliance (ASA) standard, and the second counter performs a counting operation in synchronization with a clock included in a serial signal group conforming to the SPI.

4. A communication device comprising:

communication circuitry that includes identification information in a packet that includes data blocks having a serial signal group conforming to a serial peripheral interface (SPI), the data blocks transmitted from a master in synchronization with a reference clock, the identification information identifying the data blocks, and that transmits the data blocks to a communication partner device within one frame period of a predetermined communication protocol, or that transmits the data blocks to the communication partner device in a plurality of frame periods; and a memory that sequentially stores a predetermined number of the data blocks transmitted from the master, and then outputs an other data block transmitted from a slave via the communication partner device in response to storing the predetermined number of the data blocks from the master, to transmit the other data block to the master, wherein a first period that is a period in which the predetermined number of the data blocks transmitted from the master are stored in the memory is equal to or longer than a second period that is a period in which the communication circuitry transmits a packet including the other data block to the communication partner device.

5. The communication device according to claim 4, wherein the second period is longer than a half period of the first period.

6. The communication device according to claim 4, wherein the communication circuitry transmits the other data block stored in the memory to the communication partner device in the frame period after the second period elapses from when the predetermined number of the data blocks transmitted from the master are stored in the memory.

7. The communication device according to claim 4, wherein the communication circuitry transmits the other data block stored in the memory to the communication partner device in the frame period before the second period elapses from when the predetermined number of the data blocks transmitted from the master are stored in the memory.

8. The communication device according to claim 7, wherein, in a case where a given data block to be transmitted to the communication partner device is not ready, the communication circuitry stops transmitting the given data block to the communication partner device until a next frame period.

9. The communication device according to claim 8, wherein, in a case where the given data block from the communication partner device does not arrive, the memory is delayed from storing the given data block until a next frame period.

10. The communication device according to claim 4, further comprising a shift register that sequentially stores the predetermined number of the data blocks transmitted from the master in the memory every first period, and then sequentially reads the data blocks transmitted from the communication partner device and stored in the memory every first period from the memory and transmits the data blocks to the master.

11. The communication device according to claim 10, wherein the shift register sequentially reads data blocks from the communication partner device stored in the memory and transmits the data blocks to the master, without transmitting an interrupt signal indicating that a data block from the communication partner device has arrived to the master.

12. The communication device according to claim 1, wherein the communication circuitry transmits a data block from the master to the communication partner device and receives a data block from the communication partner device in different periods within a given frame period using a communication protocol according to TDD with the communication partner device.

13. A non-transitory computer readable medium storing a program for controlling a communication device, the program being executable by a processor to perform operations comprising:

including identification information in a packet that includes data blocks having a serial signal group conforming to a serial peripheral interface (SPI), the data blocks transmitted from a master in synchronization with a reference clock, the identification information identifying the data blocks;

transmitting the data blocks to a communication partner device within one frame period of a predetermined communication protocol, or transmitting the data blocks to the communication partner device in a plurality of frame periods;

sequentially storing a predetermined number of the data blocks transmitted from the master, and then outputting an other data block transmitted from a slave via the communication partner device in response to storing the predetermined number of the data blocks from the master, to transmit the other data block to the master; and including a transmission mode information and an SPI mode information in the packet, wherein the transmission mode information indicates whether all of a plurality of frames corresponding to the data blocks are to be transmitted in a time division duplex burst or fewer than all of the plurality of frames corresponding to the data blocks are to be transmitted in the time division duplex burst, and the SPI mode information indicates a transmission processing type that is based upon a clock polarity setting and a clock phase setting corresponding to the reference clock.

14. A non-transitory computer readable medium storing a program for controlling a communication device, the program being executable by a processor to perform operations comprising:

including identification information in a packet that includes data blocks having a serial signal group conforming to a serial peripheral interface (SPI), the data blocks transmitted from a master in synchronization with a reference clock, the identification information identifying the data blocks;

transmitting the data blocks to a communication partner device within one frame period of a predetermined communication protocol, or transmitting the data blocks to the communication partner device in a plurality of frame periods;

sequentially storing, in a memory, a predetermined number of the data blocks transmitted from the master, and then outputting an other data block transmitted from a slave via the communication partner device in response to storing the predetermined number of the data blocks from the master, to transmit the other data block to the master;

measuring, with a first counter, a length of a frame period on a basis of the reference clock; and counting, with a second counter, the number of the data blocks transmitted from the master, wherein the memory sequentially stores the predetermined number of the data blocks at timing corresponding to count values of the first counter and the second counter, and then outputs the other data block.

15. A non-transitory computer readable medium storing a program for controlling a communication device, the program being executable by a processor to perform operations comprising:

including identification information in a packet that includes data blocks having a serial signal group conforming to a serial peripheral interface (SPI), the data blocks transmitted from a master in synchronization with a reference clock, the identification information identifying the data blocks;

transmitting the data blocks to a communication partner device within one frame period of a predetermined communication protocol, or transmitting the data blocks to the communication partner device in a plurality of frame periods;

sequentially storing, in a memory, a predetermined number of the data blocks transmitted from the master, and then outputting an other data block transmitted from a slave via the communication partner device in response to storing the predetermined number of the data blocks from the master, to transmit the other data block to the master, wherein a first period that is a period in which the predetermined number of the data blocks transmitted from the master are stored in the memory is equal to or longer than a second period that is a period in which a packet including the other data block is transmitted to the communication partner device.

* * * * *